United States Patent
Yamasaki

(10) Patent No.: US 11,722,783 B2
(45) Date of Patent: Aug. 8, 2023

(54) IMAGE CAPTURING APPARATUS, CONTROL METHOD THEREOF, AND NON-TRANSITORY COMPUTER-READABLE STORAGE MEDIUM TO GENERATE IMAGE DATA

(71) Applicant: CANON KABUSHIKI KAISHA, Tokyo (JP)

(72) Inventor: Shogo Yamasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/812,574

(22) Filed: Jul. 14, 2022

(65) Prior Publication Data
US 2023/0014397 A1 Jan. 19, 2023

(30) Foreign Application Priority Data
Jul. 19, 2021 (JP) .............................. JP2021-119006

(51) Int. Cl.
*H04N 23/741* (2023.01)
*H04N 23/72* (2023.01)

(52) U.S. Cl.
CPC ........... *H04N 23/741* (2023.01); *H04N 23/72* (2023.01)

(58) Field of Classification Search
CPC ...... H04N 23/741; H04N 23/72; H04N 25/51; H04N 25/535; H04N 25/59
See application file for complete search history.

(56) References Cited

U.S. PATENT DOCUMENTS

| | | | | |
|---|---|---|---|---|
| 2010/0045824 A1* | 2/2010 | Kido | ...................... | H04N 23/76 348/E9.053 |
| 2016/0112644 A1* | 4/2016 | Nishi | ................... | H04N 25/134 348/222.1 |
| 2018/0097988 A1* | 4/2018 | Tsuchiya | ............. | H01L 27/1464 |
| 2020/0304697 A1* | 9/2020 | Sasaki | .................... | H04N 25/57 |

FOREIGN PATENT DOCUMENTS

JP 2013062792 A 4/2013

* cited by examiner

*Primary Examiner* — Mekonnen D Dagnew
(74) *Attorney, Agent, or Firm* — Canon U.S.A., Inc. IP Division

(57) ABSTRACT

An image capturing apparatus generates an image of a high dynamic range that takes into account gain in addition to a range of change of storage capacitance. The image capturing apparatus having an image capturing device of a structure in which blocks each configured by a plurality of photoelectric conversion elements are arranged, includes a first control circuit, a second control circuit, and a generating circuit. The first control circuit is configured to control sensitivity in units of the blocks. The second control circuit is configured to control a gain of a signal for each block obtained by the image capturing device. The generating circuit is configured to, by mapping image data of blocks obtained under the control of the second control circuit to a region that accords with sensitivity set for the blocks in a preset high dynamic range, generate image data of the high dynamic range.

10 Claims, 21 Drawing Sheets

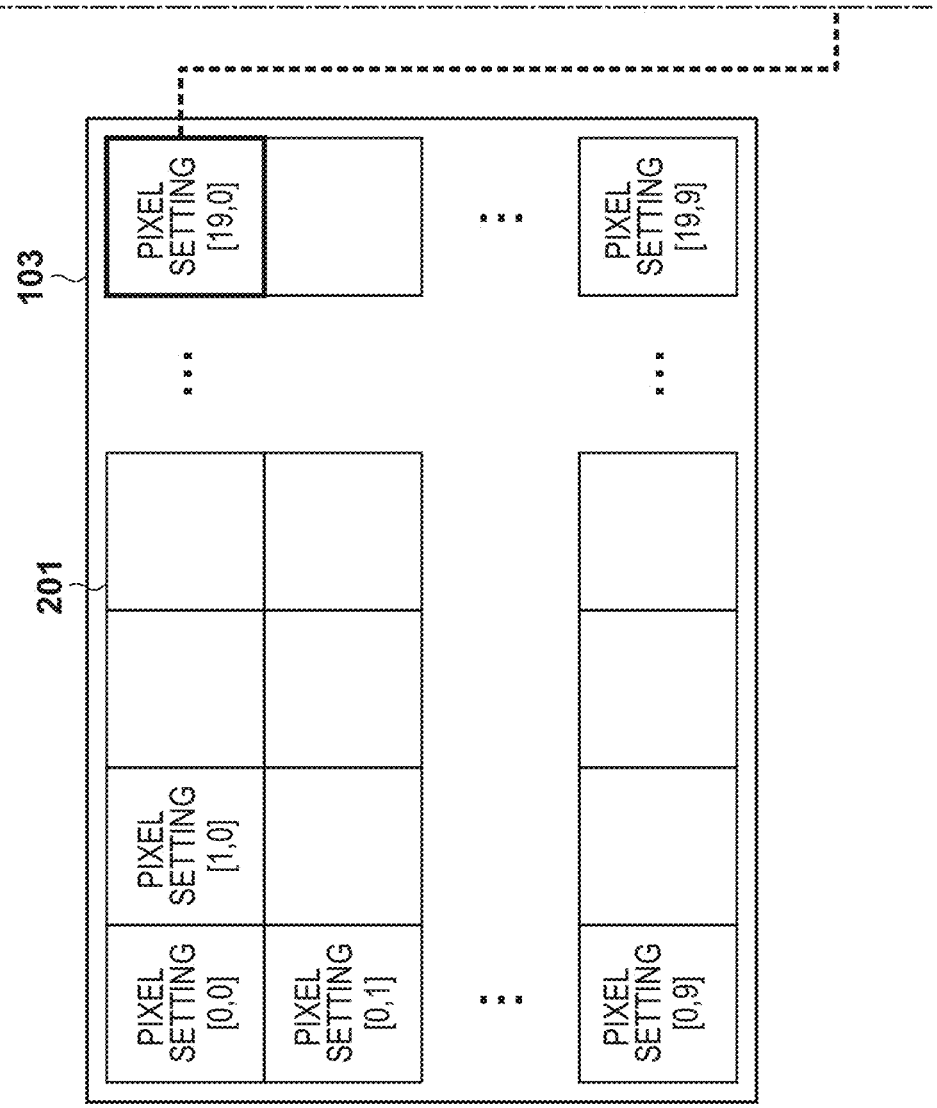

FIG. 4B

E.G.) SENSITIVITY SETTING ID [19,0]: 4

| SENSITIVITY SETTING ID | SENSITIVITY SETTING [TIMES] | SENSITIVITY SETTING CORRECTION COEFFICIENT | ANALOG GAIN ID | ANALOG GAIN [TIMES] | ANALOG GAIN CORRECTION COEFFICIENT |
|---|---|---|---|---|---|
| 0 | 16 | 1 | 0 | 8 | 1 |
|   |    |   | 1 | 4 | 2 |
|   |    |   | 2 | 2 | 4 |
|   |    |   | 3 | 1 | 8 |
| 1 | 8  | 2 | 0 | 8 | 1 |
|   |    |   | 1 | 4 | 2 |
|   |    |   | 2 | 2 | 4 |
|   |    |   | 3 | 1 | 8 |
| 2 | 4  | 4 | 0 | 8 | 1 |
|   |    |   | 1 | 4 | 2 |
|   |    |   | 2 | 2 | 4 |
|   |    |   | 3 | 1 | 8 |
| 3 | 2  | 8 | 0 | 8 | 1 |
|   |    |   | 1 | 4 | 2 |
|   |    |   | 2 | 2 | 4 |
|   |    |   | 3 | 1 | 8 |
| 4 | 1  | 16| 0 | 8 | 1 |
|   |    |   | 1 | 4 | 2 |
|   |    |   | 2 | 2 | 4 |
|   |    |   | 3 | 1 | 8 |

| EXPOSURE TIME ID | 0 | 1 | 2 | 3 | 4 |
|---|---|---|---|---|---|
| EXPOSURE TIME [SEC] | 1/30 | 1/60 | 1/120 | 1/240 | 1/480 |
| EXPOSURE CORRECTION COEFFICIENT | 1 | 2 | 4 | 8 | 16 |

| | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
| 36 | 37 | 38 | 39 | 40 |
| 41 | 42 | 43 | 44 | 45 |
| 46 | 47 | 48 | 49 | 50 |
| 51 | 52 | 53 | 54 | 55 |
| 56 | 57 | 58 | 59 | 60 |
| 61 | 62 | 63 | 64 | 65 |
| 66 | 67 | 68 | 69 | 70 |
| 71 | 72 | 73 | 74 | 75 |
| 76 | 77 | 78 | 79 | 80 |
| 81 | 82 | 83 | 84 | 85 |
| 86 | 87 | 88 | 89 | 90 |
| 91 | 92 | 93 | 94 | 95 |
| 96 | 97 | 98 | 99 | 100 |

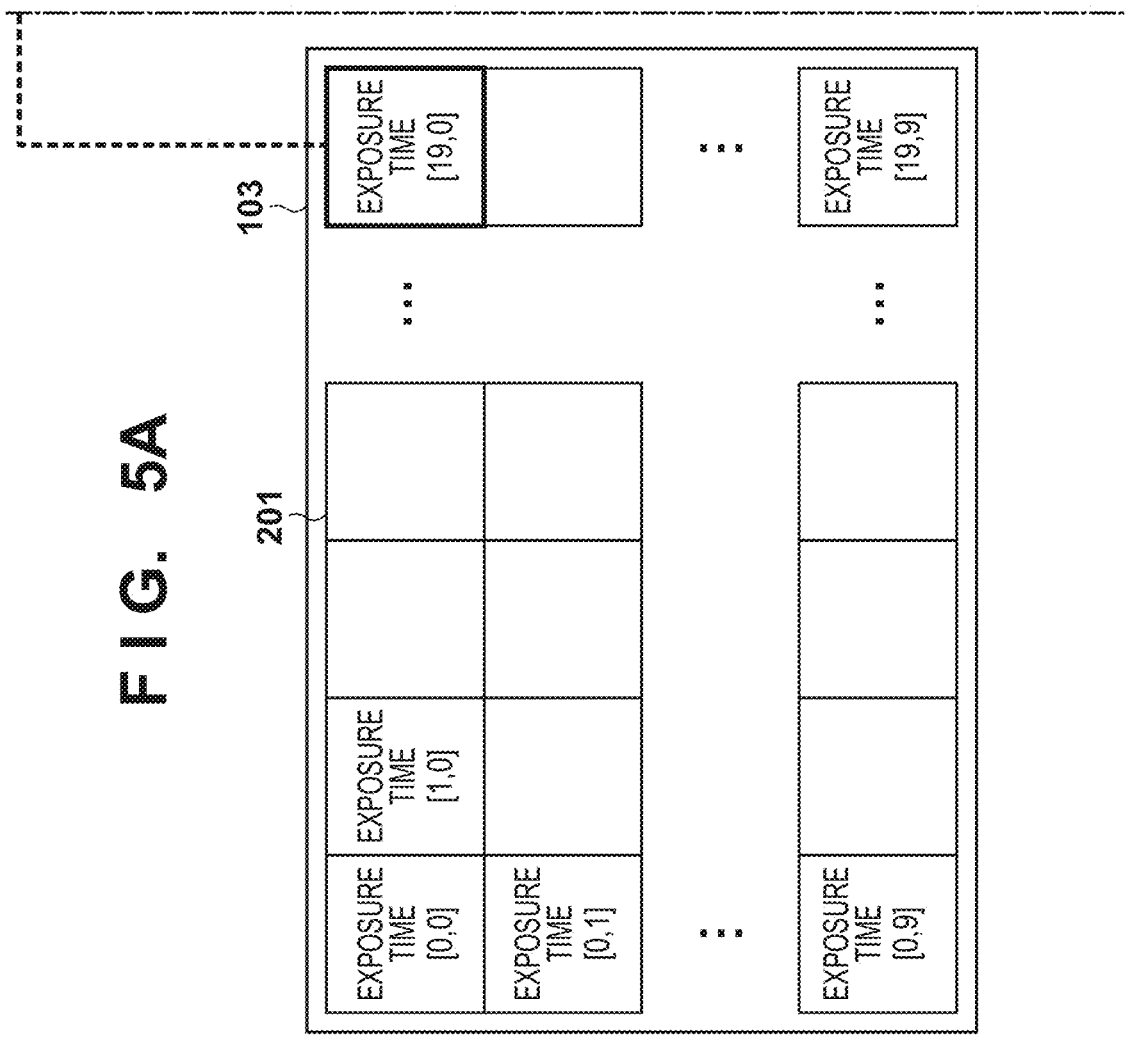

FIG. 5B

| SENSITIVITY SETTING ID | SENSITIVITY SETTING [TIMES] | SENSITIVITY SETTING CORRECTION COEFFICIENT | ANALOG GAIN ID | ANALOG GAIN [TIMES] | ANALOG GAIN CORRECTION COEFFICIENT |
|---|---|---|---|---|---|
| 0 | 16 | 1 | 0 | 8 | 1 |
|   |    |   | 1 | 4 | 2 |
|   |    |   | 2 | 2 | 4 |
|   |    |   | 3 | 1 | 8 |
| 1 | 8  | 2 | 0 | 8 | 1 |
|   |    |   | 1 | 4 | 2 |
|   |    |   | 2 | 2 | 4 |
|   |    |   | 3 | 1 | 8 |
| 2 | 4  | 4 | 0 | 8 | 1 |
|   |    |   | 1 | 4 | 2 |
|   |    |   | 2 | 2 | 4 |
|   |    |   | 3 | 1 | 8 |
| 3 | 2  | 8 | 0 | 8 | 1 |
|   |    |   | 1 | 4 | 2 |
|   |    |   | 2 | 2 | 4 |
|   |    |   | 3 | 1 | 8 |
| 4 | 1  | 16| 0 | 8 | 1 |
|   |    |   | 1 | 4 | 2 |
|   |    |   | 2 | 2 | 4 |
|   |    |   | 3 | 1 | 8 |

E.G.) EXPOSURE TIME ID[19,0]: 4

| EXPOSURE TIME ID | 0 | 1 | 2 | 3 | 4 |
|---|---|---|---|---|---|
| EXPOSURE TIME [SEC] | 1/30 | 1/60 | 1/120 | 1/240 | 1/480 |
| EXPOSURE CORRECTION COEFFICIENT | 1 | 2 | 4 | 8 | 16 |

| | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
| 36 | 37 | 38 | 39 | 40 |
| 41 | 42 | 43 | 44 | 45 |
| 46 | 47 | 48 | 49 | 50 |
| 51 | 52 | 53 | 54 | 55 |
| 56 | 57 | 58 | 59 | 60 |
| 61 | 62 | 63 | 64 | 65 |
| 66 | 67 | 68 | 69 | 70 |
| 71 | 72 | 73 | 74 | 75 |
| 76 | 77 | 78 | 79 | 80 |
| 81 | 82 | 83 | 84 | 85 |
| 86 | 87 | 88 | 89 | 90 |
| 91 | 92 | 93 | 94 | 95 |
| 96 | 97 | 98 | 99 | 100 |

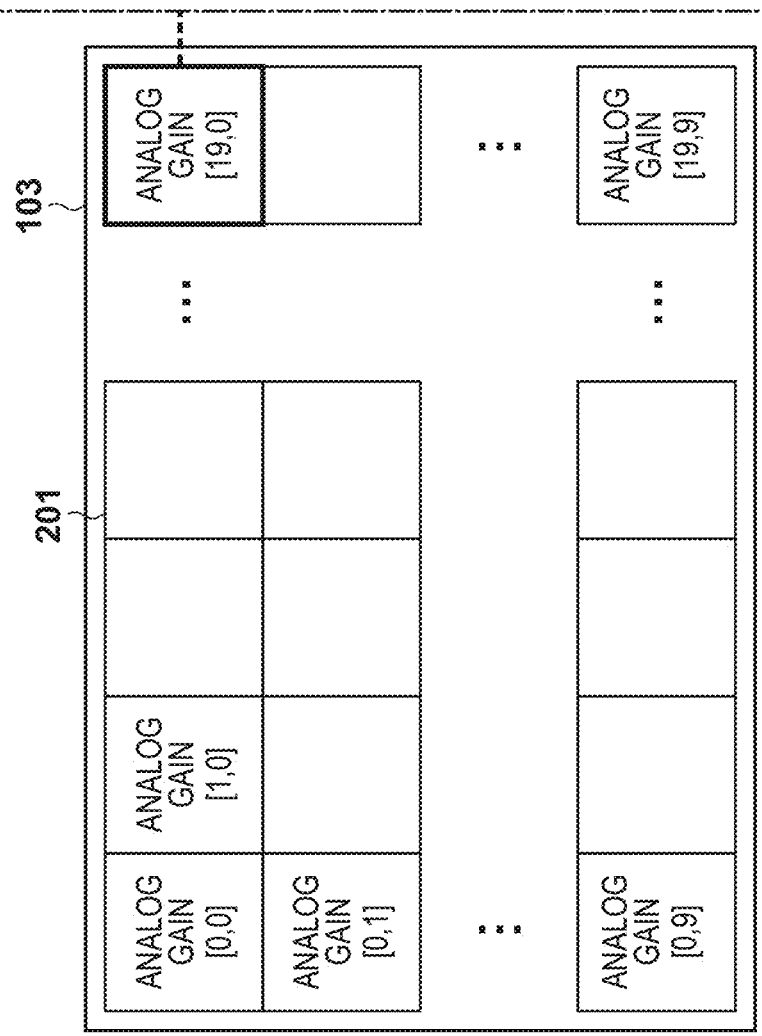

FIG. 6B

E.G.) ANALOG GAIN ID[19,0]: 1

| SENSITIVITY SETTING ID | SENSITIVITY SETTING [TIMES] | SENSITIVITY SETTING CORRECTION COEFFICIENT | ANALOG GAIN ID | ANALOG GAIN [TIMES] | ANALOG GAIN CORRECTION COEFFICIENT |
|---|---|---|---|---|---|
| 0 | 16 | 1 | 0 | 8 | 1 |
|   |    |   | 1 | 4 | 2 |
|   |    |   | 2 | 2 | 4 |
|   |    |   | 3 | 1 | 8 |
| 1 | 8  | 2 | 0 | 8 | 1 |
|   |    |   | 1 | 4 | 2 |
|   |    |   | 2 | 2 | 4 |
|   |    |   | 3 | 1 | 8 |
| 2 | 4  | 4 | 0 | 8 | 1 |
|   |    |   | 1 | 4 | 2 |
|   |    |   | 2 | 2 | 4 |
|   |    |   | 3 | 1 | 8 |
| 3 | 2  | 8 | 0 | 8 | 1 |
|   |    |   | 1 | 4 | 2 |
|   |    |   | 2 | 2 | 4 |
|   |    |   | 3 | 1 | 8 |
| 4 | 1  | 16| 0 | 8 | 1 |
|   |    |   | 1 | 4 | 2 |
|   |    |   | 2 | 2 | 4 |
|   |    |   | 3 | 1 | 8 |

| EXPOSURE TIME ID | 0 | 1 | 2 | 3 | 4 |
|---|---|---|---|---|---|
| EXPOSURE TIME [SEC] | 1/30 | 1/60 | 1/120 | 1/240 | 1/480 |
| EXPOSURE CORRECTION COEFFICIENT | 1 | 2 | 4 | 8 | 16 |
| | 1 | 2 | 3 | 4 | 5 |
| | 6 | 7 | 8 | 9 | 10 |
| | 11 | 12 | 13 | 14 | 15 |
| | 16 | 17 | 18 | 19 | 20 |
| | 21 | 22 | 23 | 24 | 25 |
| | 26 | 27 | 28 | 29 | 30 |
| | 31 | 32 | 33 | 34 | 35 |
| | 36 | 37 | 38 | 39 | 40 |
| | 41 | 42 | 43 | 44 | 45 |
| | 46 | 47 | 48 | 49 | 50 |
| | 51 | 52 | 53 | 54 | 55 |
| | 56 | 57 | 58 | 59 | 60 |
| | 61 | 62 | 63 | 64 | 65 |
| | 66 | 67 | 68 | 69 | 70 |
| | 71 | 72 | 73 | 74 | 75 |
| | 76 | 77 | 78 | 79 | 80 |
| | 81 | 82 | 83 | 84 | 85 |
| | 86 | 87 | 88 | 89 | 90 |
| | 91 | 92 | 93 | 94 | 95 |
| | 96 | 97 | 98 | 99 | 100 |

FIG. 7

| SENSITIVITY SETTING ID | SENSITIVITY SETTING [TIMES] | SENSITIVITY SETTING CORRECTION COEFFICIENT | ANALOG GAIN ID | ANALOG GAIN [TIMES] | ANALOG GAIN CORRECTION COEFFICIENT |
|---|---|---|---|---|---|
| 0 | 16 | 1 | 0 | 8 | 1 |
|   |    |   | 1 | 4 | 2 |
|   |    |   | 2 | 2 | 4 |
|   |    |   | 3 | 1 | 8 |
| 1 | 8 | 2 | 0 | 8 | 1 |
|   |   |   | 1 | 4 | 2 |
|   |   |   | 2 | 2 | 4 |
|   |   |   | 3 | 1 | 8 |
| 2 | 4 | 4 | 0 | 8 | 1 |
|   |   |   | 1 | 4 | 2 |
|   |   |   | 2 | 2 | 4 |
|   |   |   | 3 | 1 | 8 |
| 3 | 2 | 8 | 0 | 8 | 1 |
|   |   |   | 1 | 4 | 2 |
|   |   |   | 2 | 2 | 4 |
|   |   |   | 3 | 1 | 8 |
| 4 | 1 | 16 | 0 | 8 | 1 |
|   |   |    | 1 | 4 | 2 |
|   |   |    | 2 | 2 | 4 |
|   |   |    | 3 | 1 | 8 |

| EXPOSURE TIME ID | 0 | 1 | 2 | 3 | 4 |
|---|---|---|---|---|---|
| EXPOSURE TIME [SEC] | 1/30 | 1/60 | 1/120 | 1/240 | 1/480 |
| EXPOSURE CORRECTION COEFFICIENT | 1 | 2 | 4 | 8 | 16 |

A, B, C

IMAGE CAPTURING APPARATUS, CONTROL METHOD THEREOF, AND NON-TRANSITORY COMPUTER-READABLE STORAGE MEDIUM TO GENERATE IMAGE DATA

BACKGROUND

Technical Field

One disclosed aspect of the embodiments relates to an image capturing apparatus, a control method thereof, and a non-transitory computer-readable storage medium to generate image data.

Description of the Related Art

Generally, dynamic ranges of image capturing elements (e.g., image sensors) that are mounted on digital cameras and the like are smaller than dynamic ranges of the natural world. Therefore, conventionally, methods for expanding the dynamic ranges of image capturing elements have been investigated.

For example, a document Japanese Patent Laid-Open No. 2013-62792 discloses the following technique. First, it is determined for each pixel whether or not a sensor output value is saturated. Then, by determining storage capacitance for each pixel based on the determination result, an image of good contrast is obtained while saturation and output for which input-output characteristics are defective are reduced in the entire image capturing region.

In the technique described in the above document, there is the following problem.

In the above document, it is very difficult to obtain a dynamic range that exceeds a range of change of storage capacitance (in the document, there are three levels—for low sensitivity, for intermediate sensitivity, and for high sensitivity). Further, a dynamic range that is obtained in the range of change of storage capacitance is the number of tones that can be realized by a ratio of the maximum value to the minimum value of storage capacitance.

SUMMARY

In an aspect of the disclosure, an image capturing apparatus has an image capturing device of a structure in which blocks each configured by a plurality of photoelectric conversion elements are arranged. The apparatus includes a first control circuit, a second control circuit, and a generating circuit. The first control circuit is configured to control sensitivity in units of the blocks. The second control circuit is configured to control a gain of a signal for each block obtained by the image capturing device. The generating circuit is configured to, by mapping image data of blocks obtained under the control of the second controller to a region that accords with sensitivity set for the blocks in a preset high dynamic range, generate image data of the high dynamic range.

By virtue of the disclosure, it is possible to generate an image of a high dynamic range that takes into account gain in addition to a range of change of storage capacitance.

Further features of the disclosure will become apparent from the following description of exemplary embodiments (with reference to the attached drawings).

BRIEF DESCRIPTION OF THE DRAWINGS

FIGS. 4A and 4B are diagrams illustrating a sensitivity setting for each region.

FIGS. 5A and 5B are diagrams illustrating an exposure time for each region.

FIGS. 6A and 6B are diagrams illustrating an analog gain value for each region.

FIG. 7 is a diagram illustrating combinations of a sensitivity setting ID, an exposure time ID, and an analog gain ID.

DESCRIPTION OF THE EMBODIMENTS

Figure 1:
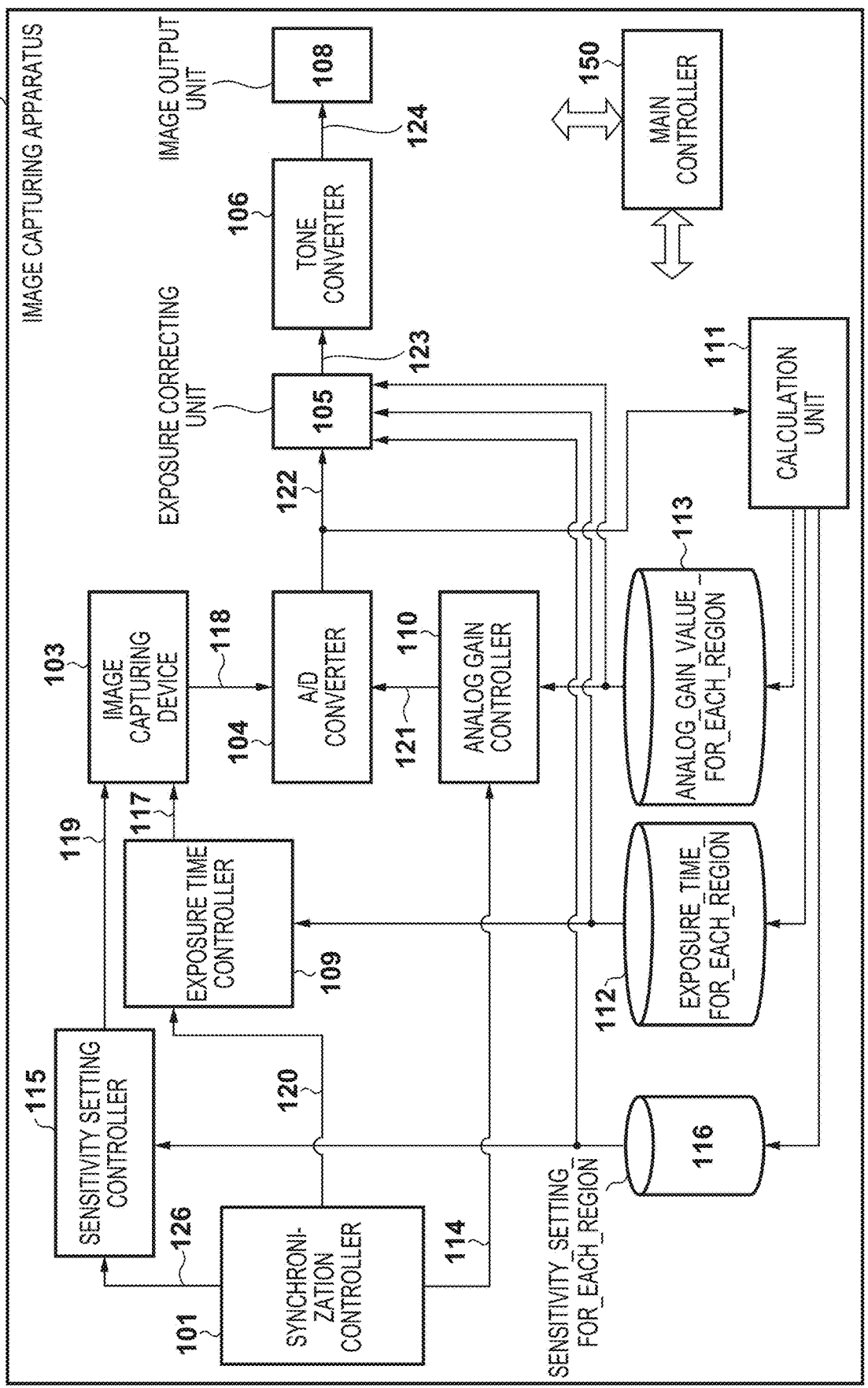
FIG. 1 is a block configuration diagram of an image capturing apparatus according to a first embodiment.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, a controller is a control circuit and include circuit elements to perform control functions.

First Embodiment

A configuration of an image capturing apparatus in a first embodiment will be described with reference to FIG. 1, and then details on the individual elements in FIG. 1 will be described with reference to FIG. 2 and subsequent drawings.

In FIG. 1, a main controller 150 is responsible for controlling the entire apparatus and is configured by a CPU, a Read Only Memory (ROM) for storing a program that the CPU executes, and a Random Access Memory (RAM) to be used as a work area of the CPU. FIG. 1 illustrates a configuration related to image capturing, and for example, a configuration of a user interface and the like (an operation unit to be operated by a user, a display for presenting information to a user, and the like) are omitted.

Hereinafter, an overview of a configuration of an image capturing apparatus 100 of FIG. 1 will be described starting with an image capturing device 103. A specific example of the image capturing device 103 is illustrated in FIG. 2. The image capturing device 103 is configured by a plurality of pixel blocks 201, and each pixel block 201 is configured by a plurality of pixels 202. In this way, the image capturing device 103 is divided into a plurality of regions (blocks), and for each region (block unit), a setting for brightness and voltage conversion efficiency of a photoelectric conversion element specified by a signal_for_sensitivity_setting_for_each_region 119 is applied, and image capturing is performed at different "brightness and voltage signal conversion efficiency" for each region. Hereinafter, the description will be continued expressing "brightness and voltage signal conversion efficiency" as sensitivity. The signal_for_sensitivity_setting_for_each_region 119 is a signal for providing the image capturing device 103 with a different sensitivity setting for each region. Furthermore, the image capturing device 103 applies a shutter specified by a shutter_pulse_for_each_region 117, performs image capturing for a different exposure time for each region, and then outputs a pixel potential 118. The shutter_pulse_for_each_region 117 is a pulse for providing the image capturing device 103 with a different shutter pulse for each region. An analog-to-digital (A/D) converter 104 applies a different analog gain at the time of A/D conversion for each region on the inputted pixel potential 118 based on an analog_gain_for_each_region 121 and then outputs an exposure_image_for_each_region 122. The analog_gain_for_each_region 121 is a value for amplifying the pixel potential 118 by a different analog gain value for each region. An exposure correcting unit or circuit 105 takes the exposure_image_for_each_region 122 as input, expands tone based on a sensitivity_setting_for_each_region 116, an exposure_time_for_each_region 112, and an analog_gain_value_for_each_region 113, and then outputs a tone-expanded image 123. The sensitivity_setting_for_each_region 116 is data in which a setting value for sensitivity for each region is collected. The exposure_time_for_each_region 112 is data in which a setting value for exposure time for each region is collected. The analog_gain_value_for_each_region 113 is data in which a setting value for an analog gain value for each region is collected. A tone converter 106 takes the tone-expanded image 123 as input, performs tone conversion (e.g., 21-bit to 11-bit gamma conversion), and then outputs a tone-converted image 124. This is done to reduce the data rate in later processing. Finally, an image output unit or circuit 108 outputs the tone-converted image 124 to a unit external to the image capturing apparatus 100. An exposure correcting unit 105 and A tone converter 106 are functioned as a generating circuit.

The remaining components of FIG. 1 will be described. A sensitivity setting controller or control circuit 115 performs control based on a sensitivity setting output pulse 126 such that each sensitivity setting is applied to each region specified by the sensitivity_setting_for_each_region 116. The sensitivity setting output pulse 126 is a pulse signal for the controller 115 for performing sensitivity setting to provide the image capturing device 103 with the sensitivity_setting_for_each_region 116 at a timing that is suitable for image capturing. At the same time, an exposure time controller 109 performs control based on an exposure time output pulse 120 such that each exposure time is applied to each region specified by the exposure_time_for_each_region 112. The exposure time output pulse 120 is a pulse signal for the exposure time controller 109 to provide the image capturing device 103 with the shutter_pulse_for_each_region 117 at a timing that is suitable for image capturing. Similarly, an analog gain controller or control circuit 110 outputs the analog_gain_for_each_region 121 based on an analog gain output pulse 114 such that each analog gain is applied to each region specified by the analog_gain_value_for_each_region 113. The analog gain output pulse 114 is a pulse signal for the analog gain controller 110 to amplify the pixel potential 118 by the analog_gain_value_for_each_region 113 in accordance with a readout timing of the pixel potential 118. A calculation unit or circuit 111 updates the sensitivity_setting_for_each_region 116, the exposure_time_for_each_region 112, and the analog_gain_value_for_each_region 113 based on the exposure_image_for_each_region 122 such that image capturing is in the optimum condition. For example, the exposure_image_for_each_region 122 acquired at the time of image capturing of a certain frame is used for setting the sensitivity_setting_for_each_region 116, the exposure_time_for_each_region 112, and the analog_gain_value_for_each_region 113 of the next frame. The exposure_image_for_each_region 122 during image capturing and the exposure_image_for_each_region 122 after image capturing may also be used for setting the sensitivity_setting_for_each_region 116, the exposure_time_for_each_region 112, and the analog_gain_value_for_each_region 113 of a certain frame. A synchronization controller 101 performs synchronization control by outputting the sensitivity setting output pulse 126, the exposure time output pulse 120, and the analog gain output pulse 114 to the sensitivity setting controller 115, the exposure time controller 109, and the analog gain controller 110, respectively. The above is an overview of the first embodiment illustrated in FIG. 1.

To illustrate a specific example, a width 206 of the image capturing device 103 in the present embodiment is set to 2000 pixels, a height 205 to 1000 pixels, a width 204 of a pixel block to 100 pixels, and a height 203 to 100 pixels. At this time, the number of pixel blocks 201 included in the image capturing device 103 is 20 in the horizontal direction and 10 in the vertical direction.

Figure 2:
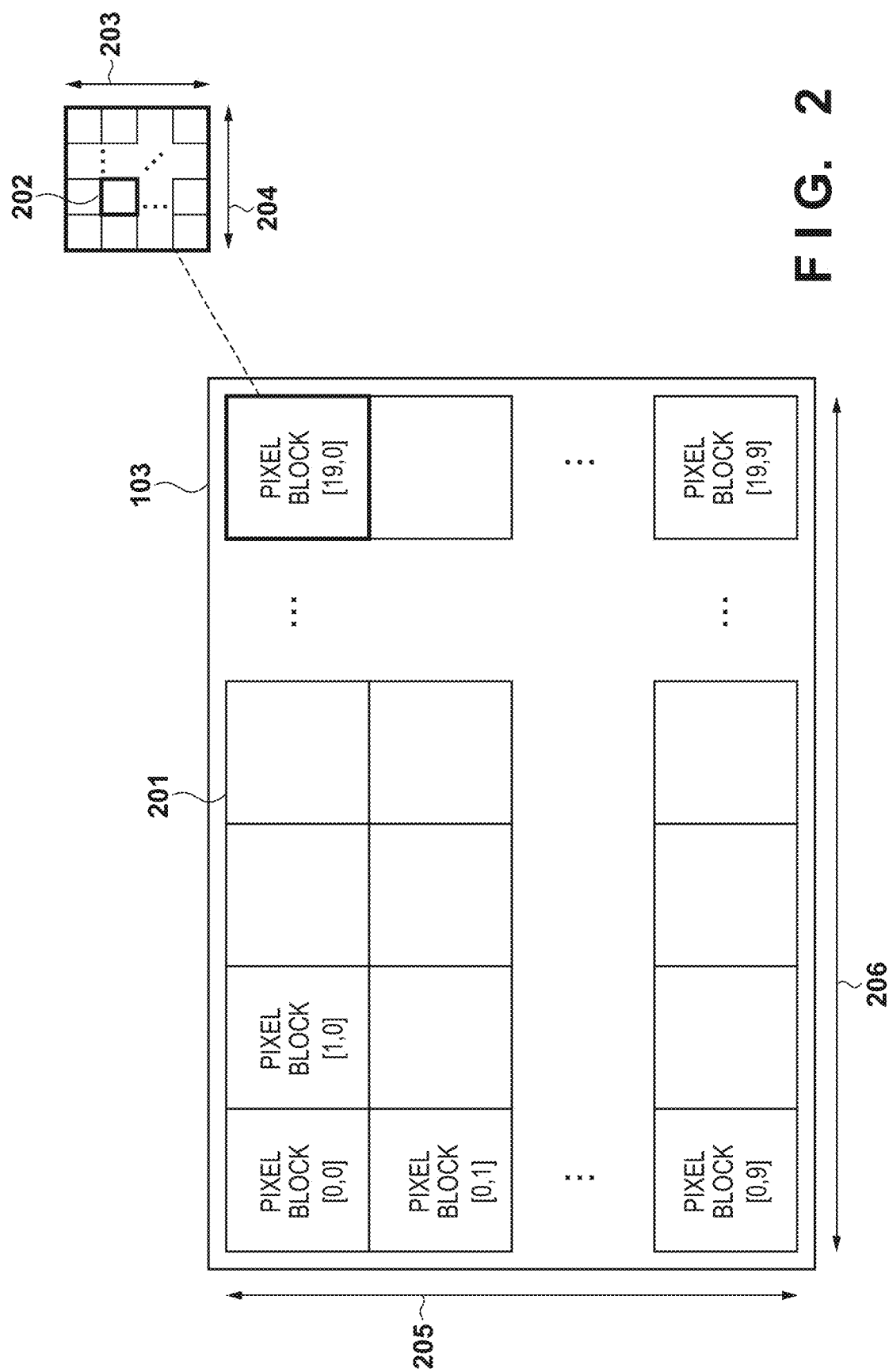
FIG. 2 is a diagram illustrating an image capturing device.
Figure 3:
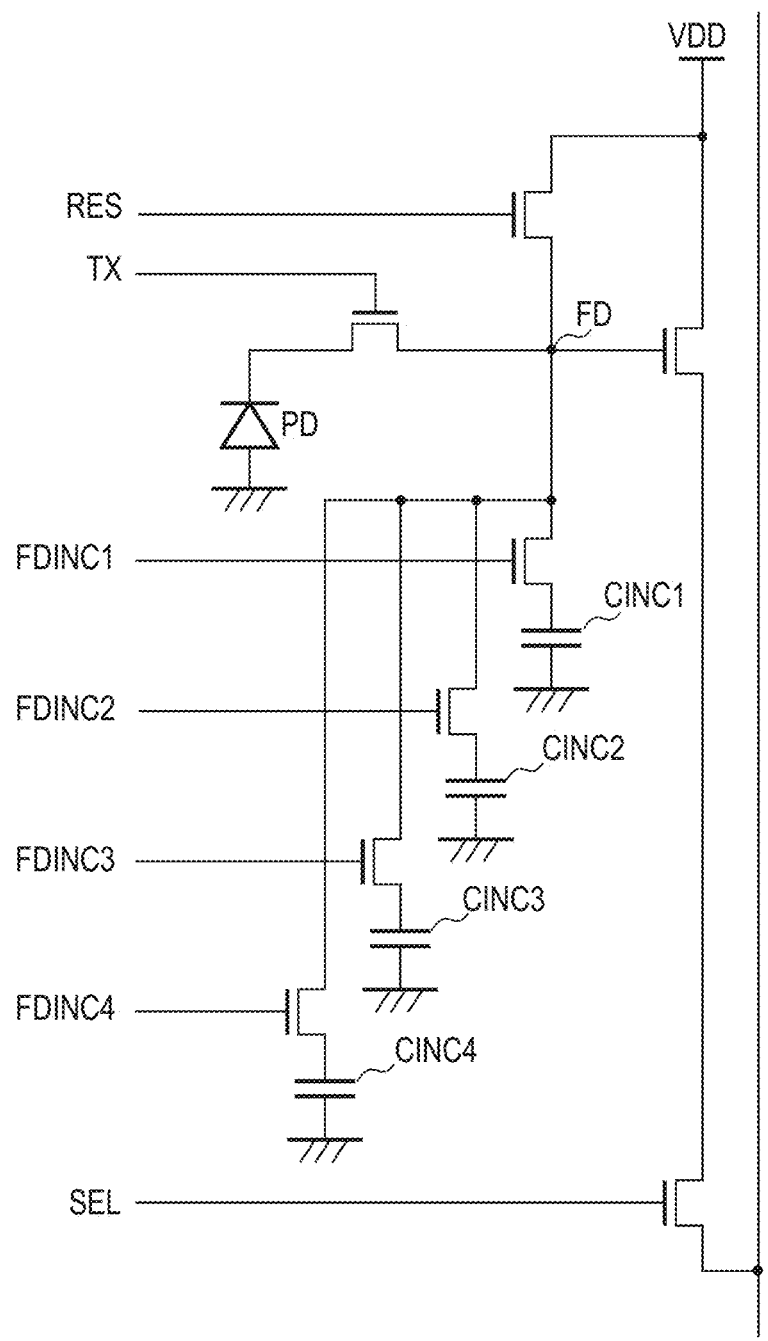
FIG. 3 is a diagram illustrating an example of a pixel circuit capable of changing an FD capacitance value for each region.

In FIG. 2, respective horizontal and vertical index values are described in brackets to indicate a position of the pixel block 201. For example, the pixel block in the upper right corner of the image capturing device 103 is described as [19, 0]. As previously described, in the embodiments, the sensitivity, exposure time, and analog gain can be controlled in units of pixel blocks. Here, the sensitivity setting is something that changes in accordance with on the size of capacitance of a floating diffusion (FD) capacitor, which is a component of a pixel circuit of the image capturing device 103. The FD capacitor is a mechanism for converting by photoelectric conversion a charge generated by a photodiode (PD), which is a component of a pixel circuit of the image capturing device 103, into a voltage signal. When the charge generated by the photodiode is Q, a voltage signal V converted by the capacitance of the FD, which is a capacitance CFD, is V=Q/CFD. When the capacitance of the FD capacitor becomes smaller, sensitivity increases, and thereby brightness increases, and when the capacitance of the FD capacitor becomes larger, sensitivity decreases, and thereby it becomes possible to capture darker images. For example, a pixel circuit having the capacitance of an FD capacitor that is CFD2, which is ½ times the capacitance of an FD capacitor that is CFD1, can obtain twice the voltage signal V. This means that it is possible to perform image capturing at twice the brightness. An example of a configuration for changing the capacitance of an FD capacitor is illustrated in FIG. 3. The charge Q generated in a photodiode (PD) is transferred to an FD by operating a shutter TX, and a voltage signal of VFD=Q/CFD is obtained in accordance with the size of CFD, which is the capacitance of the FD. At this time, when an FD capacitor CINC1 is connected by setting FDINC1 to HIGH, an obtained voltage signal becomes VFDINC1=Q/(CFD+CINC1). When everything from FDINC2 to FDINC4 are additionally set HIGH, an obtained voltage signal is VFDINCALL=Q/(CFD+CINC1+CINC2+CINC3+CI NC4). To make a voltage signal obtained from the same charge Q, that is, sensitivity, ½ times, ¼ times, ⅛ times, and 1/16 times, it is preferable to connect the capacitance of CINC1=CFD, CINC2=2CFD, CINC3=4CFD, and CINC4=8CFD. In addition, it is possible to perform control such as setting only CINC2 to HIGH for ⅓ times the voltage or setting CINC1 and CINC3 to HIGH for ⅙ times the voltage. The capacitance relationship of the present embodiment is not limited to this. The change of the capacitance of the FD capacitors for each region can be realized by controlling HIGH and LOW of FDINC1 to FDINC4 for each pixel block 201 of the image capturing device 103 by the signal_for_sensitivity_setting_for_each_region 119. Further, the present embodiment is not limited to the change of "charge and voltage signal conversion efficiency" by the change of capacitance of the FD capacitors of each pixel block 201; a configuration may be taken so as to change the "conversion efficiency of brightness and charge" of each pixel block 201. For example, two or more photodiodes (PDs) having different "brightness and charge conversion efficiency" are provided for each pixel 202 constituting the pixel block 201, and a PD having a high conversion efficiency is used when it is desired to capture brighter images, and conversely, a PD having a low conversion efficiency is used when it is desired to capture darker images.

In addition, the exposure time is a shutter time at the time of image capturing, and the larger the value is, the brighter the captured image will be. For example, it is possible to capture brighter images at an exposure time of 1/30 second than 1/480 second. Further, the analog gain is a gain of the A/D converter 104 at the time of image capturing, and the larger the value, the brighter the outputted digital pixel value. The sizes of the image capturing device 103 and the pixel block 201 are not limited to the present embodiment, and the sizes may be that in which the width-to-height ratio of one pixel of the pixel 202 is different. More specifically, the shape of one pixel of the pixel 202 may be rectangular instead of a square. Further, the pixel block 201 may be configured by one pixel 202.

The description will be continued returning to FIG. 1. The image capturing device 103 takes the signal_for_sensitivity_setting_for_each_region 119 and the shutter_pulse_for_each_region 117 as input, performs image capturing by controlling the sensitivity setting and the exposure time in units of pixel blocks 201, and then outputs the pixel potential 118. Either the signal_for_sensitivity_setting_for_each_region 119 or the shutter_pulse_for_each_region 117 may be a signal or a pulse of the same setting for all the regions. Next, the A/D converter 104 converts the pixel potential 118 to the exposure_image_for_each_region 122 based on the analog_gain_for_each_region 121 and outputs it. In the present embodiment, for realization, it is assumed that the analog_gain_for_each_region 121 takes four values ×1, ×2, ×4, and ×8, and that each pixel value of the exposure_image_for_each_region 122 is a 10-bit digital value.

Next, the exposure correcting unit 105 expands the tone of the exposure_image_for_each_region 122 based on the sensitivity_setting_for_each_region 116, the exposure_time_for_each_region 112, and the analog_gain_value_for_each_region 113 and then outputs the tone-expanded image 123. In the present embodiment, while each exposure_image_for_each_region 122 is 10 bits, the tone-expanded image 123 is 21 bits taking into account that a dynamic range increases with the sensitivity setting, the exposure time, and the analog gain. Here, a bit width (21 bits) of the tone-expanded image 123 is an example. A breakdown of the amount of increase (11 bits) from the bit width (10 bits) of the exposure_image_for_each_region 122 is 4 bits for the sensitivity setting (1 to 16 times), 4 bits for the exposure time (1/30 to 1/480 second), and 3 bits for the analog gain (1 to 8 times). The number of bits required for the amount of increase is a value of the base 2 logarithm of a ratio of a maximum value to a minimum value. More specifically, the calculation of the number of bits required for the exposure time is 4 bits (=log 2 ((1/30)÷(1/480))). To simplify the description in the present embodiment, the sensitivity setting, exposure time, and analog gain of a relatively small range have been given as examples; however, combinations thereof may be changed. More specifically, when the sensitivity setting is (1 to 128 times), 7 bits (=log 2 (128÷1)) are necessary for the amount of increase in bit width for the sensitivity setting. When the exposure time is (1/30 to 1/61440 second), 11 bits (=log 2 ((1/30)÷(1/61440))) are necessary for the amount of increase in bit width for the exposure time. Details of the processing of the exposure correcting unit or circuit 105 will be described later when describing FIG. 8.

In order to explain the processing of the exposure correcting unit or circuit 105, the sensitivity_setting_for_each_region 116, the exposure_time_for_each_region 112, and the analog_gain_value_for_each_region 113 will be described in FIGS. 4, 5, and 6. The tables in FIGS. 4A, 4B, 5A, 5B and 6A, 6B indicate that by changing a sensitivity setting ID, an exposure time ID, and an analog gain ID, respectively, 100 exposure condition IDs can be set as indicated on the right side of the table.

As illustrated in FIGS. 4A and 4B, the sensitivity_setting_for_each_region 116 has a sensitivity setting ID for each pixel block 201. The sensitivity setting ID is brightness and voltage signal conversion efficiency, and the description will be continued here using it as an example of an index indicating the FD capacitance value of FIG. 3. In the present embodiment, it is assumed that the sensitivity setting ID takes a value of 0 to 4. The actual FD capacitance values corresponding to the sensitivity setting ID will be described later in FIG. 7. The example of FIGS. 4A and 4B illustrates a case where the sensitivity ID applied to the pixel block [19, 0] located in the upper right corner of the image capturing device 103 is 4.

Next, the exposure_time_for_each_region 112 will be described with reference to FIG. 5. As illustrated, each pixel block 201 has an exposure time ID. The exposure time ID is an index indicating the exposure time. In the present embodiment, it is assumed that the exposure time ID takes a value of 0 to 4. The actual exposure time corresponding to the exposure time ID will be described later in FIG. 7. The example of FIGS. 5A and 5B illustrates a case where the exposure time ID applied to the pixel block [19, 0] located in the upper right corner of the image capturing device 103 is 4.

Next, the analog_gain_value_for_each_region 113 will be described with reference to FIGS. 6A and 6B. As illustrated, the analog_gain_value_for_each_region 113 is configured by the analog gain ID of each pixel block 201. The analog gain ID is an index indicating the analog gain. In the present embodiment, it is assumed that the analog gain ID takes a value of 0 to 3. The actual analog gain corresponding to the analog gain ID will be described later in FIG. 7. The example of FIG. 6 illustrates a case where the analog gain ID applied to the pixel block [19, 0] located in the upper right corner of the image capturing device 103 is 1.

Next, a combination of the sensitivity setting ID, the exposure time ID, and the analog gain ID will be described with reference to FIG. 7. The sensitivity setting, exposure time, and analog gain are parameters related to image capturing conditions, and in the embodiments, IDs by which images can be captured to be the brightest are set to 0. In other words, captured images are brightest at a combination (A) of the sensitivity setting ID 0 (the sensitivity setting of 16 times, that is, the FD capacitance value of $\frac{1}{16}$ times), the exposure time ID 0 (the exposure time of $\frac{1}{30}$ second), and the analog gain ID 0 (the analog gain of 8 times). Meanwhile, captured images are darkest at a combination (C) in which the sensitivity setting ID, the exposure time ID, and the analog gain ID are at their greatest. An example of a combination (B) will be described later.

First, the sensitivity setting will be described. As illustrated in FIG. 7, it is assumed that the sensitivity setting ID takes a value of 0 to 4 and corresponds to the sensitivity settings ×16 to ×1, respectively. Based on the sensitivity setting ×16 at which captured images are brightest, the brightness at each sensitivity setting (×16 to ×1) is 16 to 1 times. As a specific example, the sensitivity setting ID 4 with respect to the sensitivity setting ID 0 is ×16 with respect to the sensitivity setting x1. Therefore, the brightness of the sensitivity setting ID 4 relative to the sensitivity setting ID 0 at the time of capturing is captured at 16 times (=16÷1) the brightness. Meanwhile, when a sensitivity correction coefficient for adjusting the level of a pixel value at each sensitivity setting after image capturing is considered, it is a reciprocal of a ratio of brightness at the time of image capturing. Specifically, as illustrated in FIG. 7, the sensitivity correction coefficients are 1 to 16 times, respectively.

Next, the exposure time will be described. As illustrated in FIG. 7, it is assumed that the exposure time ID takes a value of 0 to 4, corresponding to the exposure time of $\frac{1}{30}$ [second] to $\frac{1}{480}$ [second], respectively. With an exposure time of $\frac{1}{30}$ [second] at which images can be captured to be the brightest as a reference, the brightness at the time of image capturing at each exposure time ($\frac{1}{30}$ second to $\frac{1}{480}$ second) is 1 to $\frac{1}{16}$ times. As a specific example, the exposure time ID 4 with respect to the exposure time ID 0 is the exposure time $\frac{1}{480}$ [second] with respect to the exposure time $\frac{1}{30}$ [second]. Therefore, the brightness at the time of image capturing with the exposure time ID 4 with respect to the exposure time ID 0 is captured with $\frac{1}{16}$ times (=($\frac{1}{480}$ second)÷($\frac{1}{30}$ second)) the brightness. Meanwhile, when an exposure correction coefficient for adjusting the level of a pixel value at each exposure time after image capturing is considered, it is a reciprocal of a ratio of brightness at the time of image capturing. More specifically, as illustrated in FIG. 7, the exposure correction coefficients are 1 to 16 times, respectively.

Next, the analog gain will be described. As illustrated in FIG. 7, the analog gain ID takes a value of 0 to 3 which respectively correspond to the analog gains ×8 to ×1 at the time of image capturing. As described above, the analog gain ID by which brighter images can be captured is set to 0. When an analog gain correction coefficient is considered in the same way as the exposure correction coefficient, the analog gain correction coefficients for when the analog gain of 8 times is set as a reference are 1 to 8 times, respectively, as illustrated in FIG. 7. The combination of the analog gain, exposure time and sensitivity setting is an example and, in practice, is not limited to this. Hereinafter, the processing of the exposure correcting unit or circuit 105 will be described with reference to FIGS. 8, 9, and 10 using the processing for the combinations (A), (B), and (C) in FIG. 7 as an example.

Figure 8:
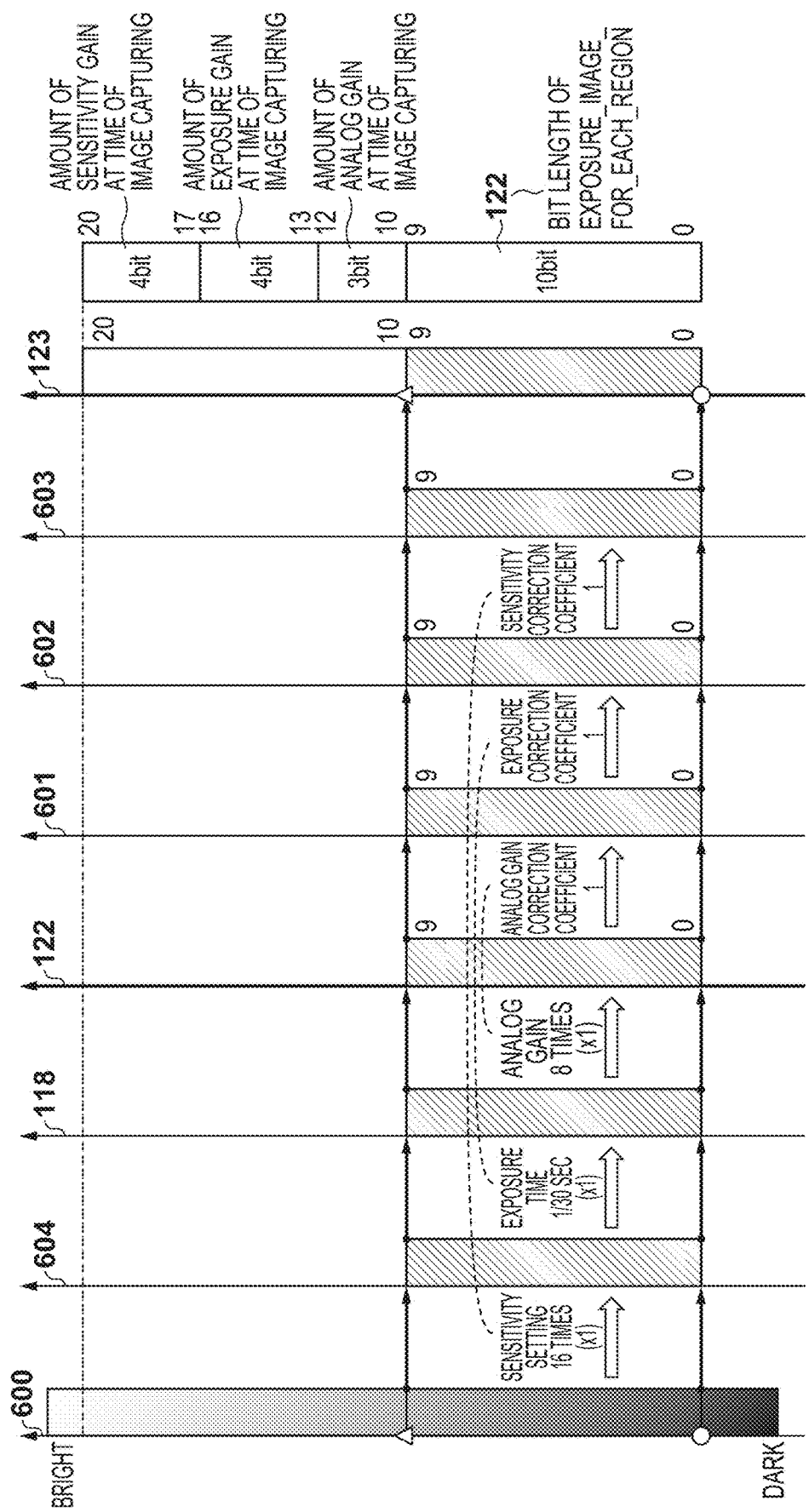
FIG. 8 is a diagram for explaining an image capturing process in a setting A.

First, in FIG. 8, processing of the exposure correcting unit or circuit 105 in the setting (A) for capturing images to be the brightest will be described. The example of FIG. 8 illustrates a case in which darker portions of a subject 600 are acquired with the brightest capturing setting (A). FIG. 8 illustrates a process up to output of the tone-expanded image 123 for when the subject 600 is captured. In this drawing, each axis is aligned based on values of the minimum luminance (o mark in the drawing) and the maximum luminance (Δ mark in the drawing) in the setting for capturing images to be the brightest (setting to be a reference). To supplement, each axis of the subject 600, a potential_obtained_influenced_by_sensitivity_setting 604, the pixel potential 118, and the exposure_image_for_each_region 122 is a value in different units. However, in order to facilitate the understanding of the description for when the setting is changed in FIGS. 9 and 10, the values of the minimum luminance (o mark in the drawing) and the maximum luminance (Δ mark in the drawing) are described to be aligned horizontally. The transition of each value is explained. First, the subject 600 is captured at a sensitivity setting of 16 times and an exposure time of $\frac{1}{30}$ second, and A/D conversion is performed at an analog gain of 8 times. The setting (A) is a setting for capturing images to be the brightest in the present embodiment, and in the following description, the brightness that can be captured by the setting (A) is a reference (1).

At this time, first, by setting the sensitivity setting of 16 times, the potential_obtained_influenced_by_ sensitivity_setting 604 is tentatively determined, and thereafter, by the exposure time 1/30, the pixel potential 118 is determined. The pixel potential 118 is A/D-converted, and then the exposure_image_for_each_region 122 is acquired. In the present embodiment, the exposure_image_for_each_region 122 is set to a value of 10 bits. When considering adjusting the level of the exposure_image_for_each_region 122 acquired under various image capturing conditions, it is necessary to make the number of bits (10 bits) of the exposure_image_for_each_region 122+4 bits in the sensitivity setting, +4 bits in the exposure time, and +3 bits in the analog gain in the present embodiment. As a result, the number of bits of the tone-expanded image 123 is 21 bits (=10+4+4+3). More specifically, as illustrated in FIG. 7, the sensitivity setting has a range of 16 times to 1 times, so the brightness obtained at 1 times must be multiplied by 16 to make it the brightness of the reference, which is 16 times, and corresponds to +4 bits (16=2^4). Similarly, since the exposure time has a range of 1/30 second to 1/480 second, the brightness obtained at 1/480 second needs to be multiplied by 16 to make it the brightness of the reference, which is 1/30 second, and corresponds to +4 bits (16=2^4). Similarly, since the analog gain has a range of 8 to 1 times, the brightness acquired at 1 times must be multiplied by 8 to make it the brightness of the reference, which is 8 times, and corresponds to +3 bits (8=2^3). Note that "x^y" represents x to the power of y.

In FIG. 8, when the level of brightness of the exposure_image_for_each_region 122 is adjusted, the analog gain is first A/D-converted by the reference of 8 times, so analog gain correction coefficient becomes 1 as illustrated in FIG. 8. Similarly, since image capturing has been performed with the exposure time of the reference of 1/30 second, the exposure correction coefficient becomes 1 as illustrated in FIG. 8. Similarly, since image capturing has been performed with the sensitivity setting of 16 times, which is the reference, the sensitivity correction coefficient becomes 1 as illustrated in FIG. 8. Therefore, the analog gain correction coefficient (1 times) is applied to the exposure_image_for_each_region 122 to obtain an analog-gain-corrected image 601. Then, an exposure correction coefficient (1 times) is further applied to obtain an exposure-corrected image 602. Then, a sensitivity correction coefficient (1 times) is further applied to obtain a sensitivity-corrected image 603. It is possible to obtain a 21-bit tone-expanded image 123 by expanding the bits of the sensitivity-corrected image 603.

The following can be said about the brightest capturing setting (A) in FIG. 8 when considering the whole; the darker side of the subject 600 in the tone-expanded image 123 is mapped to the lower bits in the high dynamic range. Therefore, processing with this setting (A) is suitable for capturing darker regions.

Figure 9:
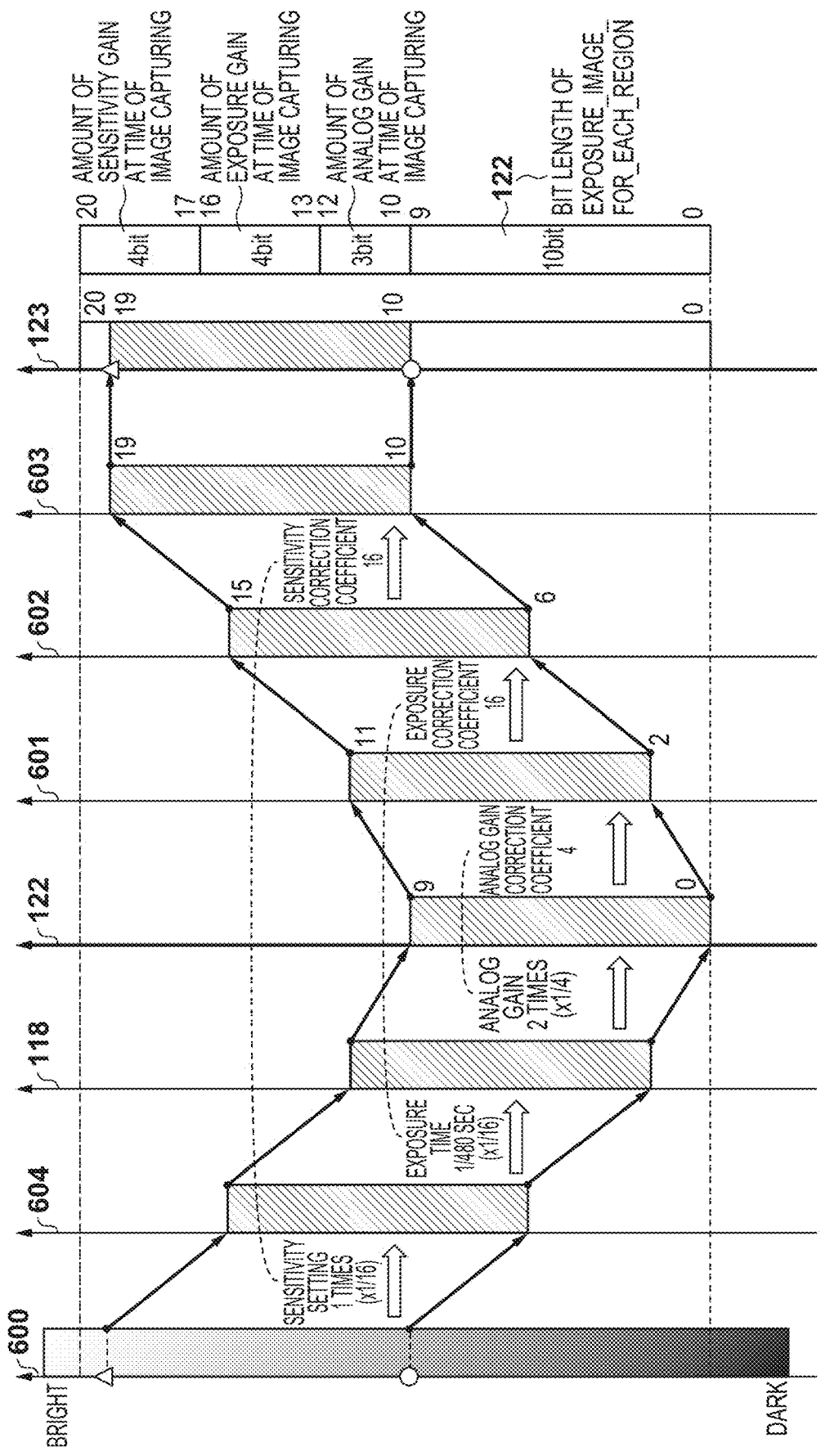
FIG. 9 is a diagram for explaining an image capturing process in a setting B.

Next, an example of the processing of the exposure correcting unit or circuit 105 in the case where the sensitivity setting is 1 times, the exposure time is 1/480 second, and the analog gain is 2 times in FIG. 9 (the image capturing condition (B) in FIG. 7) will be described. The sensitivity setting 1 times is a sensitivity setting that is 1/16 of 16 times, which is the reference, and the exposure time of 1/480 second is a time that is 1/16 of 1/30 second, which is the reference, so the pixel potential 118 is a value of (1/16)×(1/16)=1/256 times the subject 600. Similarly, since the analog gain 2 times is a gain of 1/4 times with respect to the reference of 8 times, the exposure_image_for_each_region 122 is a value of 1/4 times with respect to the pixel potential 118. As a result, values on the brighter side of the subject 600 are mapped to 10 bits of the exposure_image_for_each_region 122. Next, the level of the value of the exposure_image_for_each_region 122 is adjusted to the reference image capturing condition (sensitivity setting 16 times, exposure time 1/30 second, analog gain 8 times). At this time, as illustrated, the analog gain correction coefficient is 4 (=8 times÷2 times), the exposure correction coefficient is 16 (=(1/30 second)÷(1/480 second)), and the sensitivity correction coefficient is 16 (=16 times÷1 times). When the analog gain correction coefficient 4, the exposure correction coefficient 16, and the sensitivity correction coefficient 16 are applied, the exposure-corrected image 602 is mapped to 10 bits (4×16×16=2^10) on the upper bit side on the exposure_image_for_each_region 122. As a result, the exposure_image_for_each_region 122 is mapped to 10 to 19 bits of the tone-expanded image 123 (21 bits). As a result, the relatively bright portion side of the subject 600 is mapped to the tone-expanded image 123.

Figure 10:
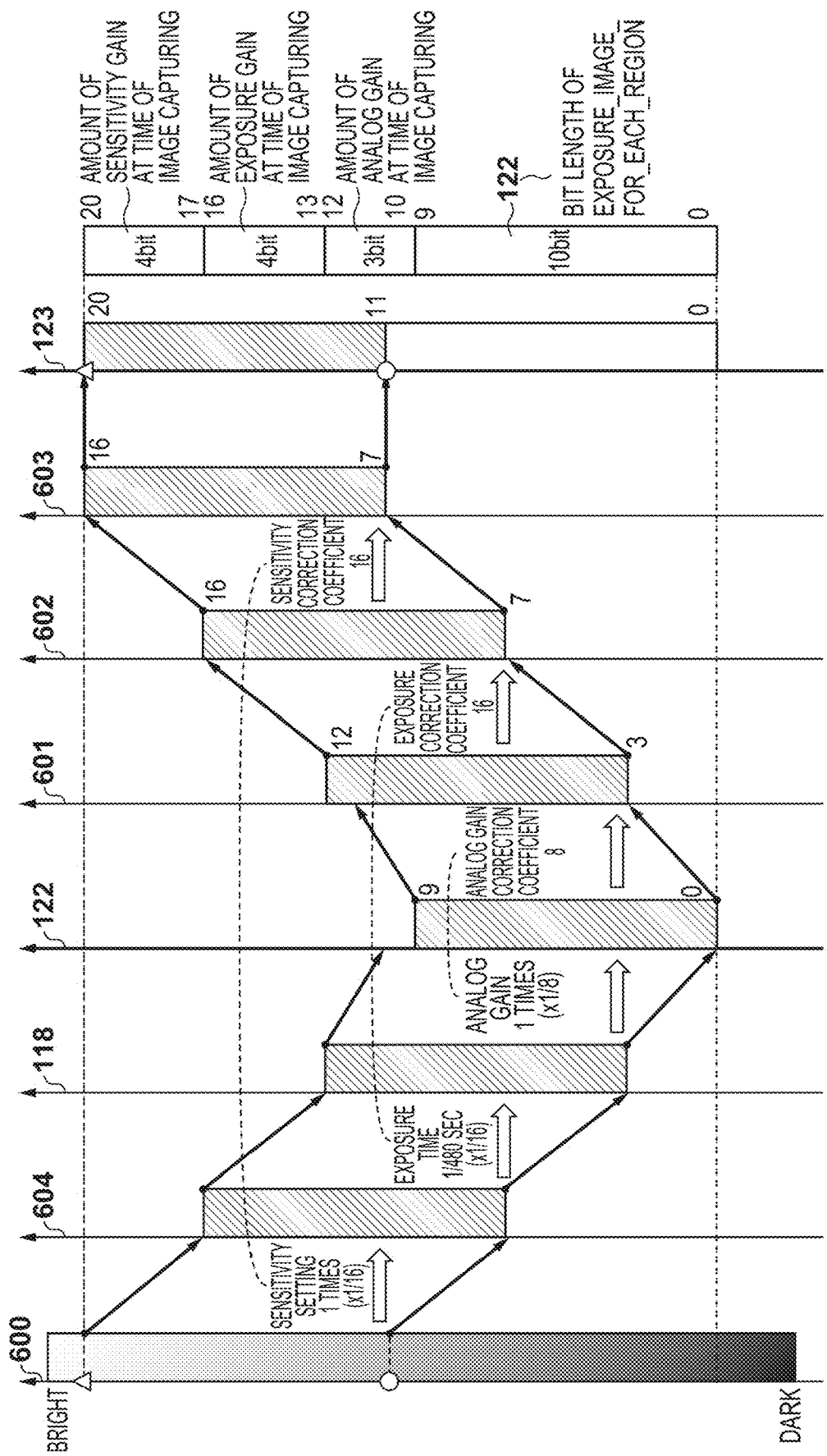
FIG. 10 is a diagram for explaining an image capturing process in a setting C.

Next, FIG. 10 illustrates processing of the exposure correcting unit 105 in the case of capturing brighter portions of the subject 600 with the darkest setting (image capturing condition (C) in FIG. 7). Since the series of processing in FIG. 10 is substantially equivalent to the processing in FIGS. 8 and 9, the description will be omitted. In the example of FIG. 10, a case is illustrated in which the exposure_image_for_each_region 122 is mapped to the most significant bit side (11 to 20 bits) of the tone-expanded image 123.

As described above, FIGS. 8, 9, and 10 illustrate processing in which the exposure correcting unit 105 of FIG. 1 converts the exposure_image_for_each_region 122 (10 bits) into the tone-expanded image 123 (21 bits).

Figure 11:
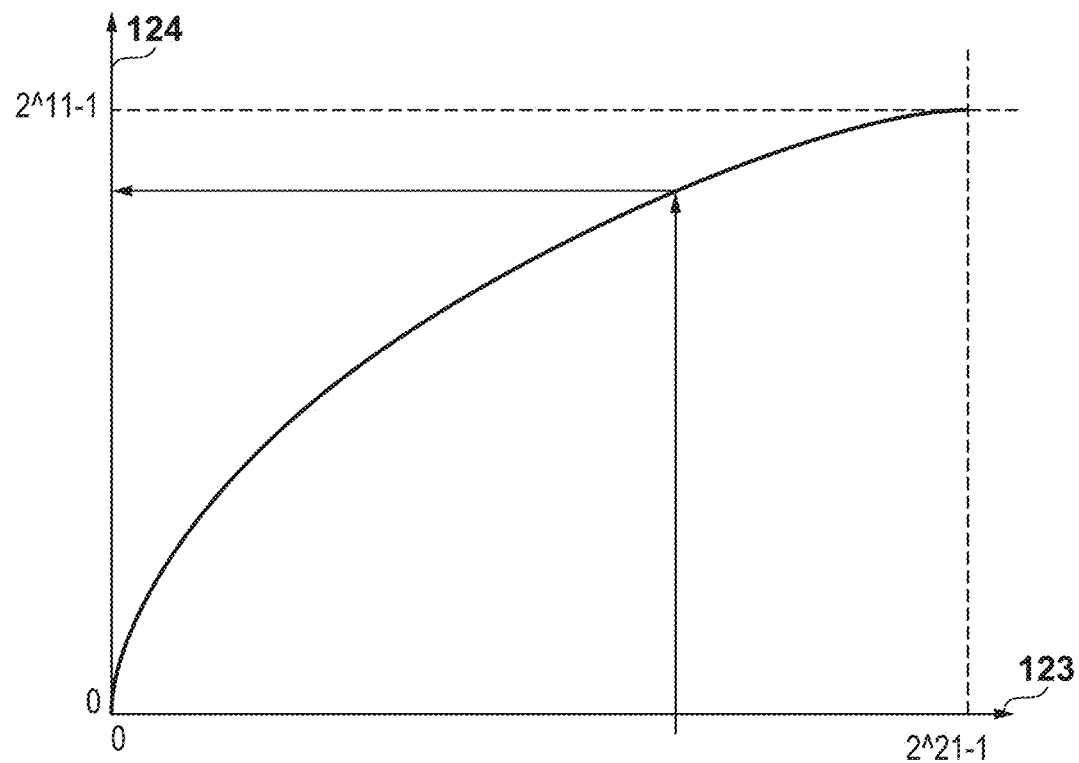
FIG. 11 is a diagram illustrating processing of a tone converter.

Next, the tone converter 106 of FIG. 1 will be described with reference to FIG. 11. The tone converter 106, which is a part of generating circuit, applies the tone conversion processing in pixel units on the tone-expanded image 123 (21 bits) and converts it to the tone-converted image 124 (12 bits in the present embodiment). The processing of the tone converter 106 is performed to reduce the bit length of the tone-expanded image 123 (21 bits) and to reduce the output data rate of the sensor. As a specific example, as illustrated in FIG. 11, the number of tones of the tone-expanded image 123 (0 to 2^21−1) is mapped to the number of tones of the tone-converted image 124 (0 to 2^11−1) to generate originally-intended image data of a high dynamic range.

Although an embodiment in which the exposure correcting unit 105 and the tone converter 106 of FIG. 1 are connected in that order has been described in this description, the disclosure is not necessarily limited to that order, and the order may be switched.

The tone-converted image 124 is inputted to the image output unit or circuit 108 and is outputted to an external unit or circuit. There are high-speed serial I/Fs such as LVDS (Low Voltage Differential Signaling) and MIPI (Mobile Industry Processor Interface) as examples of the image output unit or circuit 108.

Since the description began from image capturing device 103 in the description of FIG. 1, the description will be continued returning to the synchronization controller or circuit 101. The synchronization controller 101 supplies the sensitivity setting output pulse 126 to the sensitivity setting controller or circuit 115, the exposure time output pulse 120 to the exposure time controller 109, and analog gain output pulse 114 to the analog gain controller or circuit 110. Thus, synchronization control is performed for the processing of the sensitivity setting controller 115, the exposure time controller 109 and the analog gain controller 110. Here the sensitivity setting output pulse 126 is a signal for controlling the timing at which the sensitivity setting controller 115 outputs the signal_for_sensitivity_setting_for_each_region 119. Similarly, the exposure time output pulse 120 is a signal for controlling the timing at which the exposure time controller 109 outputs the shutter_pulse_for_each_region 117. Similarly the analog gain output pulse 114 controls the timing at which the analog gain controller 110 outputs the analog_gain_for_each_region 121. By the sensitivity setting controller 115, the exposure time controller 109, and the analog gain controller 110 operating in synchronization, it is possible to change the sensitivity setting, the exposure time, and the analog gain for each arbitrary pixel block of the image capturing device 103, which is an image sensor, and perform image capturing.

Figure 12:
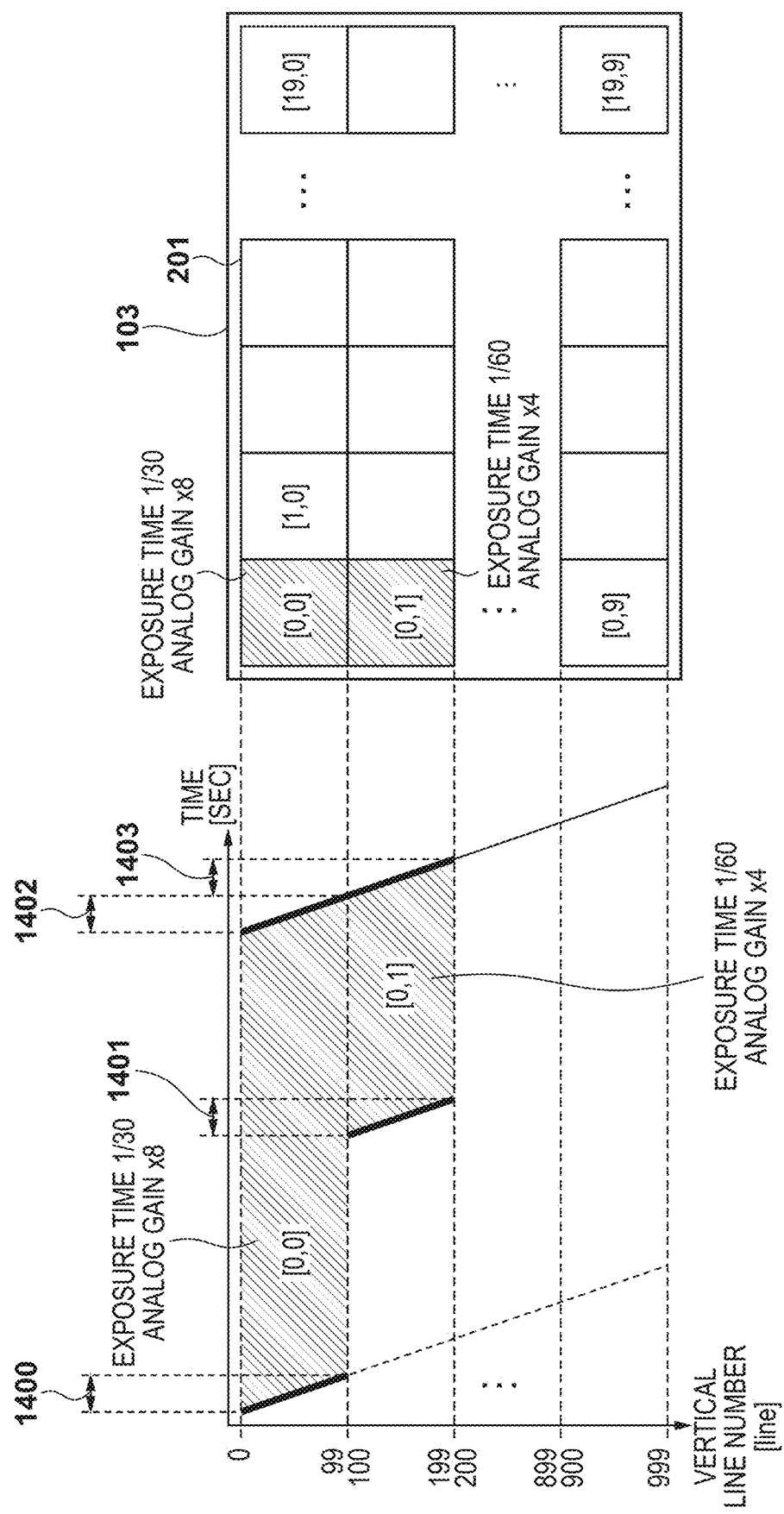
FIG. 12 is a timing chart illustrating processing of a synchronization controller.

The processing by the synchronization controller 101 and a case in which different sensitivity settings, exposure times, and analog gains are applied to [0, 0] and [0, 1] of the pixel block 201, respectively, will be described with reference to FIG. 12. To the left of the illustrated pixel blocks 201 is illustrated operation timing of the shutter and analog gain application, with the horizontal axis as time and the vertical axis as the vertical line number. First, an exposure time of ⅓₀ second and an analog gain of 8 times are applied to [0, 0], which is the pixel block 201 in the upper left corner. For this purpose, the 0th to 99th lines are driven (1400) at the shutter time of ⅓₀ second and then driven (1402) at the analog gain of 8 times. For each line of the pixel block 201 [0, 0] illustrated in the timing chart, the same exposure time (⅓₀ second) is applied to each line while shifting the start and end timings as illustrated. Similarly, for the pixel block 201 [0, 1], an exposure time of ⅙₀ second (1401) and an analog gain of 4 times are applied (1403). The synchronization controller 101 adjusts the start timing of exposure so that the end timing of the exposure time for each line is the driving timing of the analog gain. Further, the sensitivity setting is not illustrated since it need only be completed by the start of the shutter operation of the next frame after the readout operation following the shutter operation of an arbitrary frame.

Next, the exposure time controller 109 takes the exposure time output pulse 120 and the exposure_time_for_each_region 112 as input and outputs the shutter_pulse_for_each_region 117. The shutter_pulse_for_each_region 117 is a drive signal for applying a shutter for a desired exposure time to each pixel block specified by the exposure_time_for_each_region 112.

Figure 13:
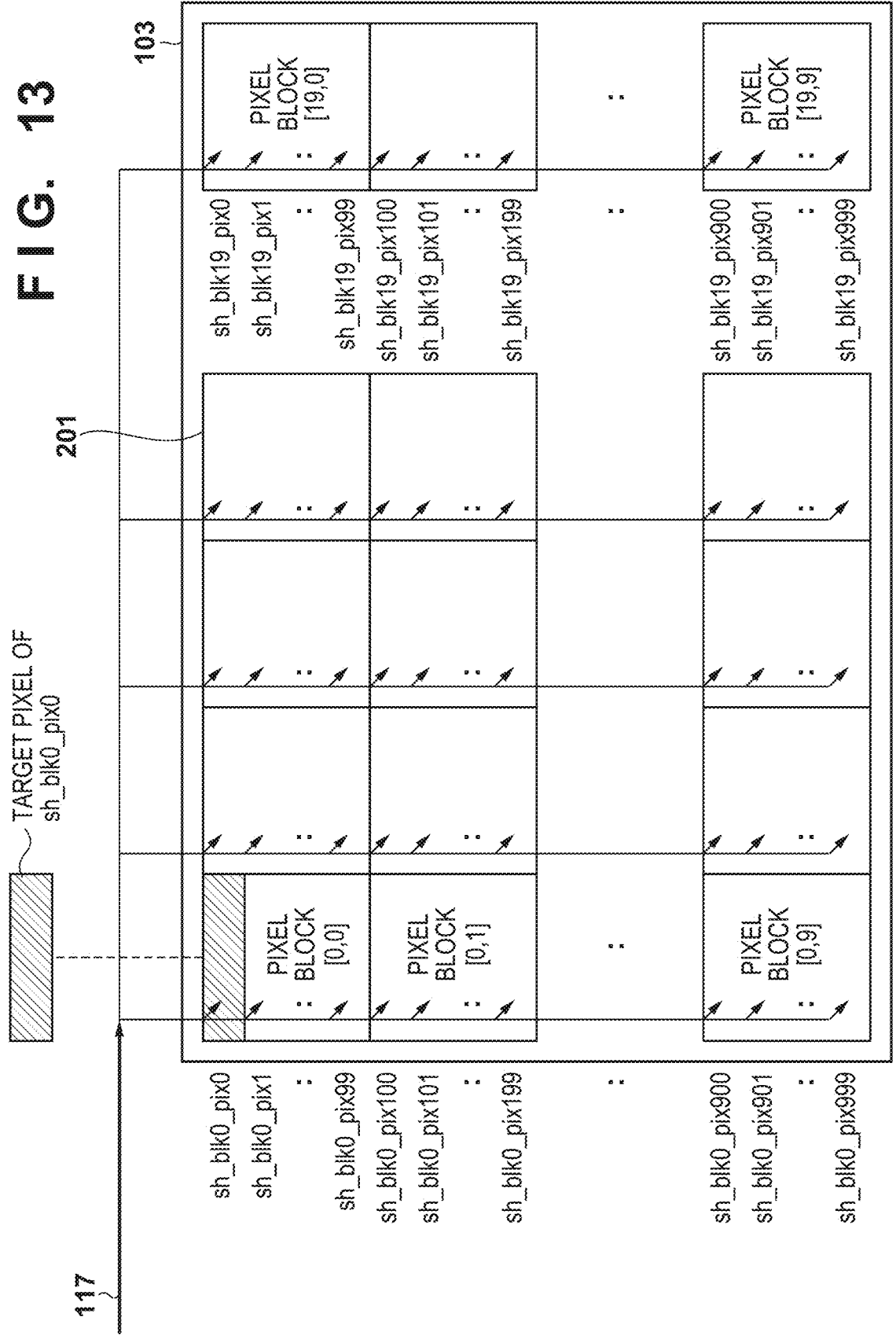
FIG. 13 is a diagram illustrating a connection of a shutter pulse for each region.

FIG. 13 illustrates the relationship between the shutter_pulse_for_each_region 117 and the pixel blocks. The shutter_pulse_for_each_region 117 is a bundle of shutter signals for applying a plurality of shutter speeds to each region. As illustrated in FIG. 13, the shutter_pulse_for_each_region 117 is connected to each line of pixel blocks of the image capturing device 103 and controls the exposure time for each pixel block. To supplement, in the example of FIG. 13, the shutter_pulse_for_each_region 117 is divided horizontally into sh_blk0_pix* to sh_blk19_pix*, each of which is further divided in a row direction and connects to one line of the pixel block. Here, "*" refers to the number of pixels in the vertical direction of the pixel blocks 201. In the present embodiment, since there are 100 pixels, "*" is a number between "0" and "99". Each signal is implemented to be independently controllable. Focusing on the leftmost pixel blocks in the horizontal direction, the shutter_pulse_for_each_region 117 is divided into sh_blk0_pix0 to sh_blk0_pix999, and for example, sh_blk0_pix0 connects the gray line of FIG. 13. In a typical image sensor, a shutter pulse is connected to each line in the vertical direction, and uniform exposure time is applied to the entire image capturing device 103 by applying a rolling shutter. In contrast, in the present embodiment, the shutter_pulse_for_each_region 117 is connected to each pixel block in the horizontal direction, and a different exposure time is applied to each pixel block in the horizontal direction. In addition, by switching to a different exposure time at the boundary of the pixel block in the vertical direction, it is possible to apply a different exposure time for each pixel block.

Figure 14:
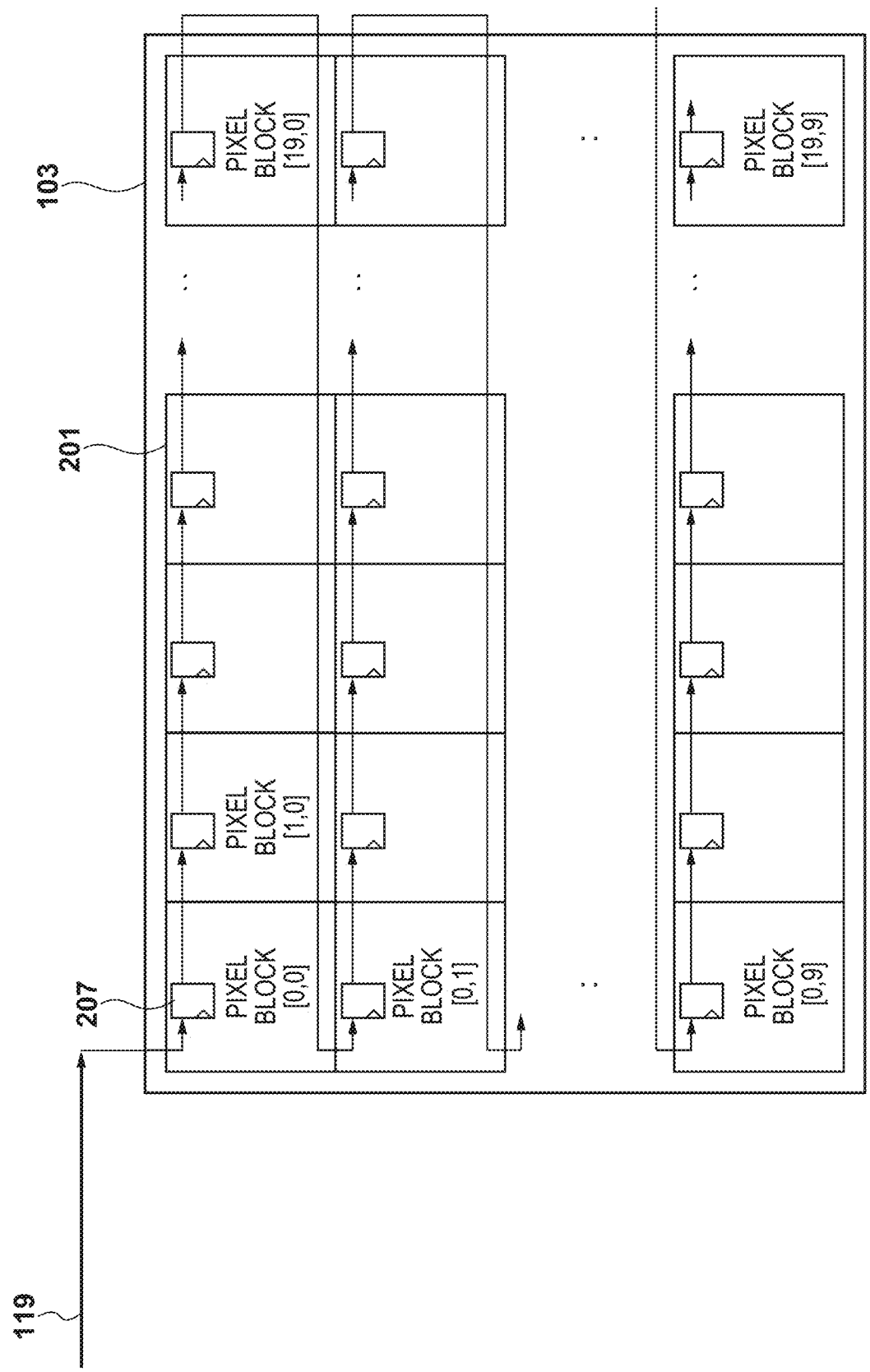
FIG. 14 is a diagram illustrating a connection of a signal for a sensitivity setting for each region.

FIG. 14 illustrates the relationship between the signal_for_sensitivity_setting_for_each_region 119 and the pixel blocks. The signal_for_sensitivity_setting_for_each_region 119 is a signal for applying each sensitivity setting to each region. As illustrated in FIG. 14, the sensitivity setting for each pixel block of the image capturing device 103 is controlled by the value of the signal_for_sensitivity_setting_for_each_region 119 being shifted using sensitivity setting shift registers 207. The disclosure is not limited to this and the signal_for_sensitivity_setting_for_each_region 119 may be wired in parallel to all the regions.

Returning to FIG. 1, the sensitivity setting controller 115 takes the sensitivity setting output pulse 126 and the sensitivity_setting_for_each_region 116 as input and outputs the signal_for_sensitivity_setting_for_each_region 119. The signal_for_sensitivity_setting_for_each_region 119 applies a desired sensitivity setting for each pixel block specified by the sensitivity_setting_for_each_region 116. Further, the analog gain controller 110 takes the analog gain output pulse 114 and the analog_gain_value_for_each_region 113 as input and outputs the analog_gain_for_each_region 121. The analog_gain_for_each_region 121 applies a desired analog gain for each pixel block specified by the analog_gain_value_for_each_region 113.

Similarly, in FIG. 1, the calculation unit or circuit 111 calculates, based on the luminance distribution of the captured exposure_image_for_each_region 122, the sensitivity_setting_for_each_region 116, the exposure_time_for_each_region 112, and the analog_gain_value_for_each_region 113 so as to be optimally set. Specifically, a histogram of pixel values is calculated for each pixel block, and if the pixel values are distributed on the brighter side, the setting is changed to a darker capturing setting. A specific example will be described with reference to FIGS. 9 and 10. Assume that when the pixel values of the tone-expanded image 123 are distributed on the brighter side when image capturing is performed under the setting of FIG. 9 (the image capturing condition (B) of FIG. 7), it is desired to acquire pixel values of the brighter side. To do so, the exposure_time_for_each_region 112 and the analog_gain_value_for_each_region 113 are updated so that a darker image can be captured. Specifically, the image capturing condition (B) is changed to the setting in FIG. 10 (the image capturing condition (C) in FIG. 7 which is the darkest capturing setting). Similarly, when the pixel values are distributed on the darker side, the setting is reversed. The calculation unit 111 performs the above-described processing for each pixel block.

Figure 15:
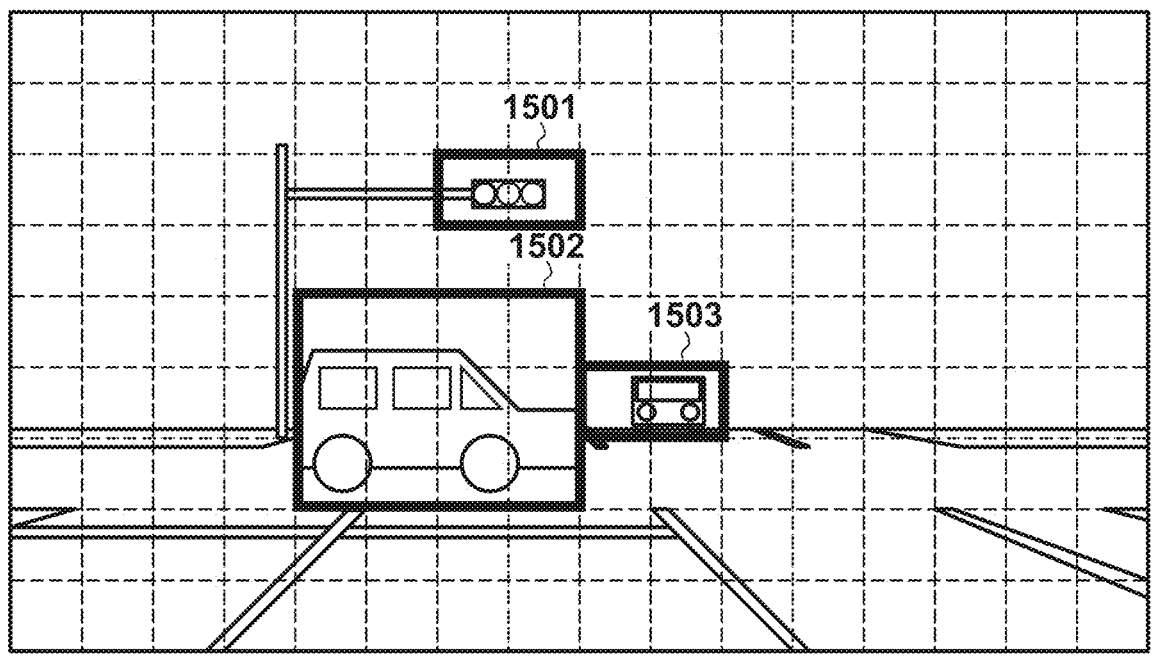
FIG. 15 is a diagram illustrating an example of a video by a vehicle-mounted camera during the daytime in which a traffic light is captured.

Further, a method for determining the sensitivity_setting_for_each_region 116, the exposure_time_for_each_region 112, and the analog_gain_value_for_each_region 113 in the calculation unit 111 in FIG. 1 in an image capturing scene in which a subject having an emission frequency, such as an LED traffic light, is captured within an angle of view will be explained. As illustrated in FIG. 15, an example is a case of a region in which an LED traffic light

1501 is captured when it is bright such as during the daytime. Assume that the exposure condition suitable for the brightness of this example is that the exposure time is set to be relatively short at 1/7680 second and the gain is 1 times. If an LED emission frequency in the region of the LED traffic light 1501 is 90 Hz and the ON/OFF duty ratio is 1:1, it means that the light is flashing repeatedly at 1/180 second intervals. When the exposure time is 1/7680 second, which is shorter than 1/180 second and a period in which the LED is turned off and the exposure time overlap, an image of a state in which the traffic light is turned off is outputted to the image output unit or circuit 108. This is called LED flicker. When a region in which the region of the LED traffic light 1501 exists in the screen is specified and the exposure time of that region is lengthened to 1/120 second to avoid LED flicker, the brightness increases by (1/120)/(1/7680)=64 times. A method of selecting a region in which the region of the LED traffic light 1501 exists may be manual input of a region by a user or may be setting by machine learning processing such as object recognition or image division. Since the analog gain is already 1 times, the brightness cannot be suppressed by the analog gain. When image capturing is performed at this exposure time, overexposure occurs due to the scene being bright, which reduces the visibility of the image signal obtained by the image output unit 108. In order to make the image signal obtained by the image output unit 108 be the same brightness as the exposure time of 1/7680 second and the analog gain of 1 times, which are the original optimum exposure conditions, the sensitivity setting is set to 1/64 times the reference setting and then image capturing is performed. Thus, it is possible to realize image capturing at the optimum exposure conditions in addition to suppressing the LED flicker. Although the optimum exposure time is determined by the emission frequency of the LED traffic light 1501, the setting of the exposure time may be manually inputted by the user or may be performed by machine learning processing such as object recognition and image division for recognizing the traffic light. These methods for setting a region may be held in the image capturing apparatus 100 or external to the image capturing apparatus 100.

Figure 16:
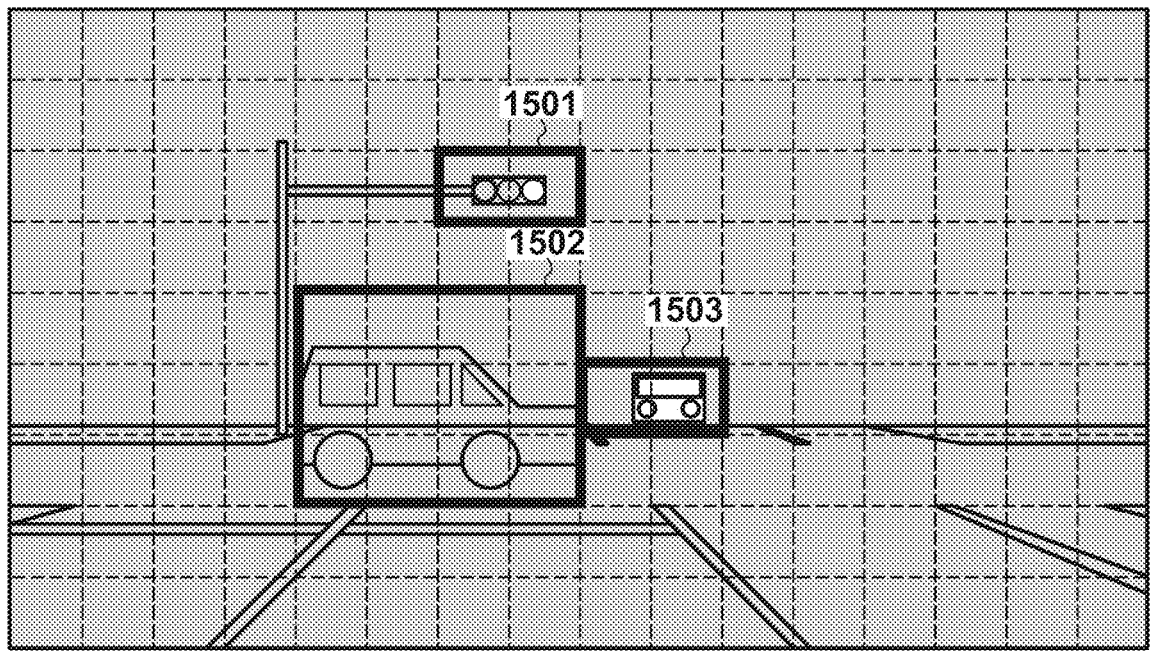
FIG. 16 is a diagram illustrating an example of a night-time video by the vehicle-mounted camera in which a moving vehicle is captured.

Further, a method for determining the sensitivity_setting_for_each_region 116, the exposure_time_for_each_region 112, and the analog_gain_value_for_each_region 113 in the calculation unit 111 of FIG. 1 in an image capturing scene in which a moving subject such as a vehicle is captured within an angle of view will be explained. As illustrated in FIG. 16, an example is a case of a region in which a moving vehicle 1502 is captured when it is dark such as during the nighttime. Assume that the exposure condition suitable for the brightness of this example is that the exposure time is set to be relatively long at 1/120 second and the gain is 8 times. When the region of the moving vehicle 1502 is moving from left to right within the angle of view, motion blur may occur at the set exposure time of 1/120 second depending on the movement speed. If the exposure time is shortened to 1/1920 second to suppress the motion blur, the brightness will be (1/1920)/(1/120)=1/16 times (it becomes darker). It is necessary to make the gain 16 times to obtain an image with the same brightness as when an image is captured with an exposure time of 1/120 second and an analog gain of 8 times; however, if the image is made brighter by increasing the analog gain factor, noise becomes conspicuous in the image. In this case, in order to achieve the same brightness as the exposure time of 1/120 second and the analog gain of 8 times, the sensitivity setting is set to 16 times the reference setting, thereby achieving image capturing under the optimum exposure condition in which motion blur of a moving subject is suppressed in a dark image capturing scene. In addition, the optimum exposure time for a moving subject depends on the movement speed of the subject (how many pixels it moves per second). This information may be set by machine learning processing such as object recognition or image division, or the exposure time may be set individually for each subject selected by the user. These methods for setting a region may be held in the image capturing apparatus 100 or external to the image capturing apparatus 100. In addition, since the region of a vehicle_whose_headlights_are_on 1503 has a relatively high brightness in a scene at the nighttime, the optimum exposure conditions can be set for each region, such as an exposure time of 1/960 seconds, an analog gain of 4 times, and a sensitivity setting of 1 times, for example.

As in the above-described examples in FIGS. 15 and 16, the calculation unit 111 determines the optimum exposure time for each region based on the observation information on the subject and has a function for performing adjustment by sensitivity when adjustment by gain is impossible, inconvenient, or problematic. Impossible, inconvenient, or problematic refers to cases where visibility is determined to be reduced due to any of the following situations occurring in the obtained image: a situation that is too dark, a situation that is too bright, a situation in which there is motion blur, a situation in which there is noise, or a situation in which what is to be captured is no longer captured. Here, the observation information on the subject is the presence or absence of an LED traffic light and its emission frequency. The moving speed of the subject has been given as an example. However, the present embodiment is not limited to this, and the type of the observation information, and the order of determination and order of priority of the sensitivity setting, exposure time, and analog gain are not limited to this. Further, a configuration may be taken so as to able to set the sensitivity_setting_for_each_region 116, the exposure_time_for_each_region 112 and the analog_gain_value_for_each_region 113 of a frame from a unit external to the image capturing apparatus 100.

With the above configuration, the image sensor of the present embodiment performs image capturing by controlling the sensitivity setting, exposure time, and analog gain for each pixel block in synchronization. By controlling the sensitivity setting for each region in addition to the exposure time and analog gain with this configuration, the dynamic range can be extended by the amount of sensitivity setting. Furthermore, it is possible to obtain an image that is not overexposed even when the exposure time is lengthened for LED flicker suppression in a region in which it is bright and an LED (a traffic light or the like) is captured in the frame. Further, it is possible to increase the brightness by shortening the exposure time to suppress motion blur in a region in which it is dark and there is movement in the subject. This control is performed for each region, thereby making it possible to achieve both LED flicker and motion blur suppression in an image capturing scene where a bright region and a dark region coexist. Meanwhile, there is processing called digital gain in which an A/D-converted digital value is multiplied by a coefficient. In the case of digital gain processing, if a low luminance value becomes 0 (underexposure) in an A/D-converted value or a high luminance value becomes the MAX of the digital value (overexposure), due to the characteristics of the processing of multiplying by a coefficient, it is impossible to recover the tones. In contrast, the adjustment of the analog gain provides an advantage that the problem of the aforementioned underexposure and overexposure can be solved within the range of the analog gain.

In addition, the level of the pixel value obtained by the different exposure time and analog gain for each pixel block is adjusted, and an image with a reduced bit length is outputted by tone conversion processing.

In the above configuration, the main controller 150 sets, prior to starting the image capturing processing, the same preset image capturing conditions (sensitivity, exposure time, gain) for all the blocks in the image capturing device 103 and then starts image capturing at a predetermined frame rate (e.g., 30 frames/second), for example. Then, the main controller 150 controls the calculation unit 111 to obtain, for example, an average luminance value of each block from the A/D converter 104 every time the image data of the current frame is obtained. Then, the calculation unit 111 performs processing for updating the image capturing conditions for each block based on the average luminance value of each block and the image capturing conditions that have been set for each block at that time.

Second Embodiment

Figure 17:
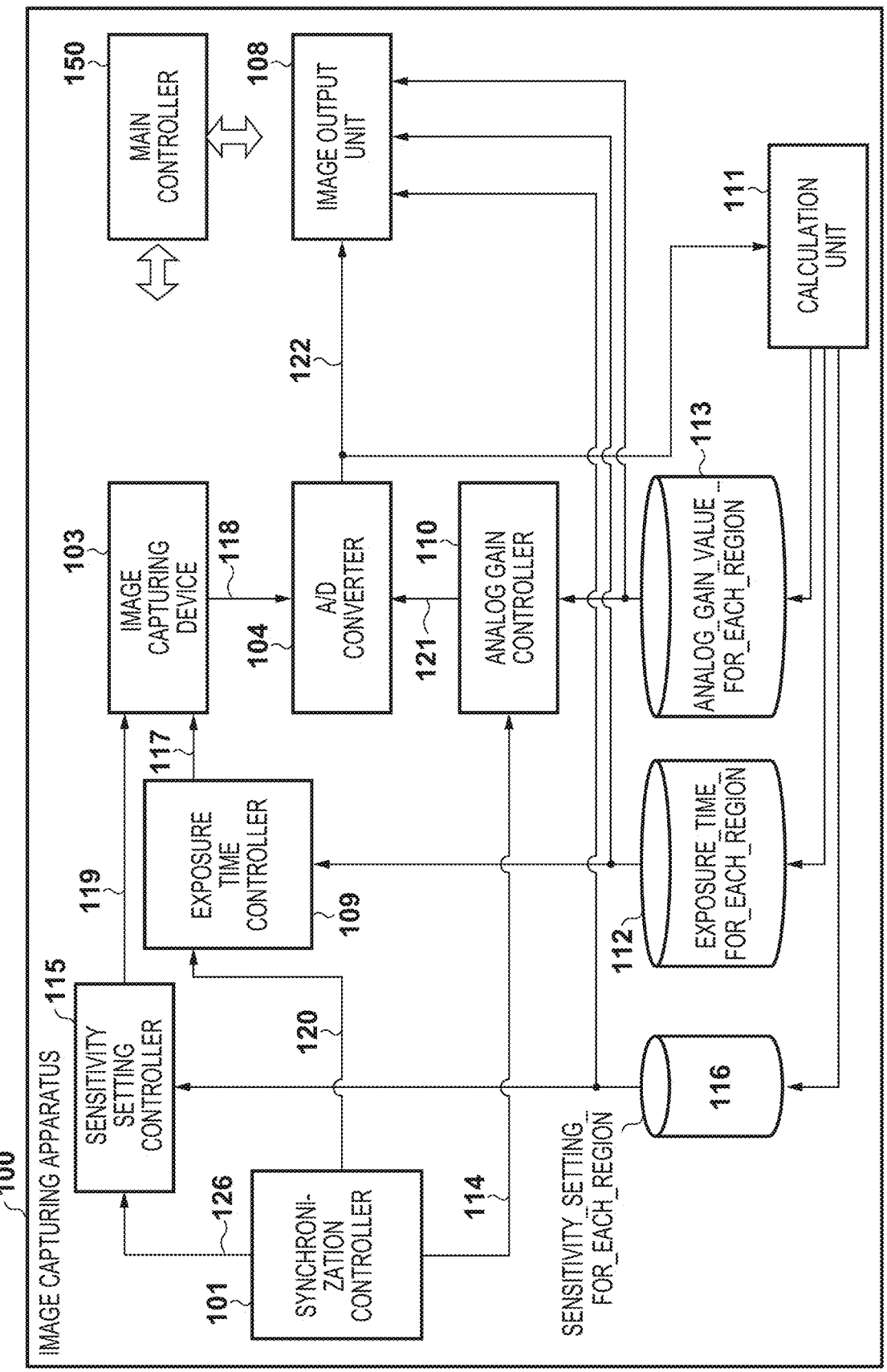
FIG. 17 is a block configuration diagram of the image capturing apparatus according to a second embodiment.

FIG. 17 is a block configuration diagram of the image capturing apparatus according to a second embodiment. In the first embodiment (FIG. 1), the exposure correcting unit 105 and the tone converter 106 are provided, while the second embodiment does not include these. Therefore, the second embodiment outputs the 10-bit exposure_image_for_each_region 122 as is from the image output unit 108. In addition, the image output unit 108 outputs the exposure_time_for_each_region 112 and the analog_gain_value_for_each_region 113. In the present embodiment, it is assumed that the processing of the exposure correcting unit 105 of FIG. 1 and thereafter are performed in an external apparatus connected to the image capturing apparatus 100. In the second embodiment, an example is illustrated in which the exposure_time_for_each_region 112 and the analog_gain_value_for_each_region 113 are outputted together with the exposure_image_for_each_region 122; however, there is no need to limit the disclosure to this configuration, and the disclosure may be configured to output them from another I/F such as a serial IO.

Third Embodiment

Figure 18:
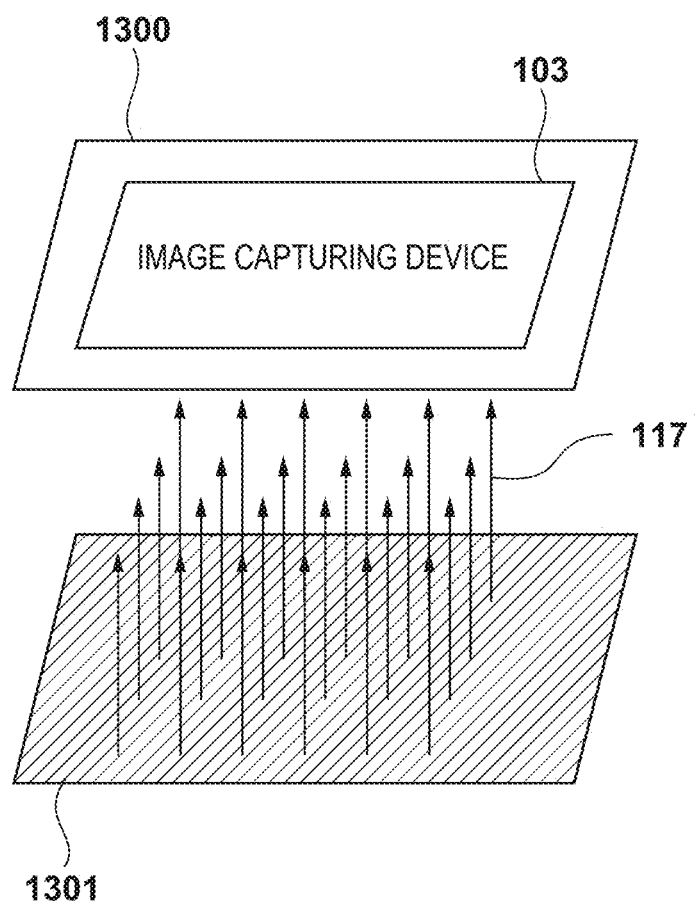
FIG. 18 is a diagram illustrating a multi-layered circuit including the image capturing device of a third embodiment.

A third embodiment will be described with reference to FIG. 18. As illustrated, it has a multi-layered structure (a two-layer structure in the illustration). The image capturing device 103 is disposed in a first layer (a sensor layer 1300) for exposure, the sensitivity setting controller 115 and the exposure time controller 109 are disposed in the other layer (a circuit layer 1301), and the signal_for_sensitivity_setting_for_each_region 119 and the shutter_pulse_for_each_region 117 are vertically wired between the layers of the multi-layered structure. Regarding the shutter_pulse_for_each_region 117, due to the characteristic that different shutter pulse is connected for each region, the number of wires increases. Therefore, when an attempt is made to achieve this in a normal one-layer image sensor, the image capturing device 103 is blocked by the shutter_pulse_for_each_region 117, and a sufficient pixel surface area cannot be reserved. In contrast, in the third embodiment, there is an advantage that it is possible to reserve a sufficient pixel surface area since it is possible to dispose, in general, only the image capturing device 103 on the sensor layer 1300. The same applies to the signal_for_sensitivity_setting_for_each_region 119. The number of layers is not limited to two layers, and a configuration of three or more layers may be taken. Further, how the sensor layer 1300 and the circuit layer 1301 are divided is an example, and components other than the image capturing device 103 may be placed on the sensor layer 1300.

Fourth Embodiment

Figure 19:
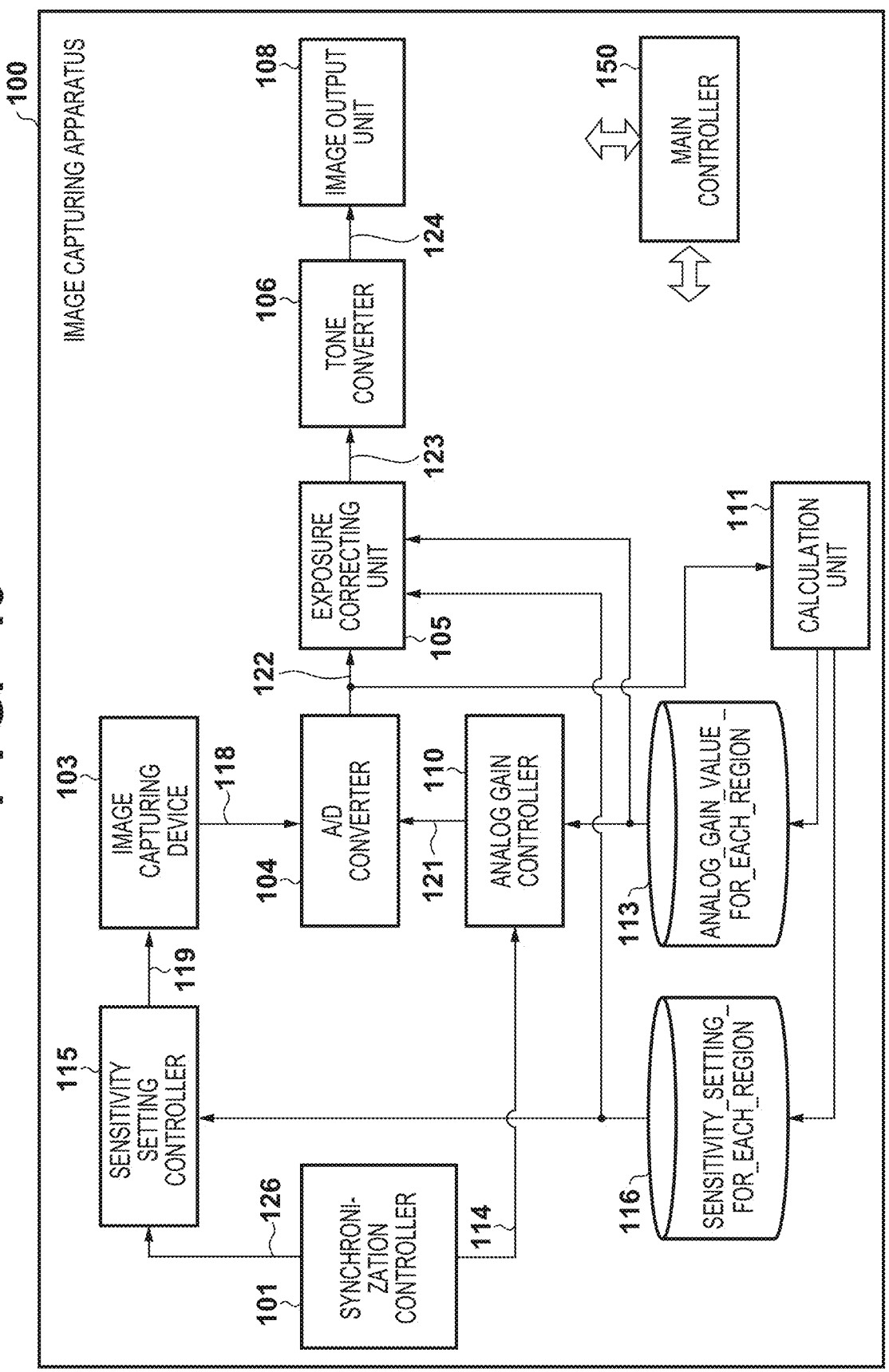
FIG. 19 is a block configuration diagram of the image capturing apparatus according to a fourth embodiment.

FIG. 19 is a block configuration diagram of the image capturing apparatus according to a fourth embodiment. While the first embodiment (FIG. 1) has the exposure_time_for_each_region 112, the exposure time controller 109, the exposure time output pulse 120, and the shutter_pulse_for_each_region 117, the fourth embodiment does not have these. Therefore, although the sensitivity setting and gain can be changed for each region, the fourth embodiment applies a uniform exposure time for the entire region of an image regarding the exposure time. The 10-bit exposure_image_for_each_region 122 is outputted as is from the image output unit 108. In addition, in the exposure correcting unit, the bit is not shifted by the exposure time. Since it becomes possible to omit the processing for controlling the timing of the shutter for each region and it becomes no longer necessary to wire a plurality of shutters for each region according to the present embodiment, it is expected that the physical configuration of the image capturing device 103 will be simplified. Although an example has been described, it is not necessary to limit the disclosure to this configuration, a configuration may be such that the order is changed or a configuration may be taken so as to incorporate the image processing included in the first embodiment.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-119006, filed Jul. 19, 2021 which is hereby incorporated by reference herein in its entirety.

What is claimed is:

1. An image capturing apparatus having an image capturing device of a structure in which blocks each configured by a plurality of photoelectric conversion elements are arranged, the apparatus comprising:
   a first control circuit configured to control sensitivity in units of the blocks;
   a second control circuit configured to control a gain of a signal for each block obtained by the image capturing device; and
   a generating circuit configured to, by mapping image data of blocks obtained under the control of the second control circuit to a region that accords with sensitivity set for the blocks in a preset high dynamic range, generate image data of the high dynamic range.

2. The apparatus according to claim 1, further comprising a third control circuit configured to set an exposure time in units of the blocks.

3. The apparatus according to claim 2, wherein the generating circuit performs tone expansion on image data of blocks obtained under the control of the second control circuit based on:
   a first correction coefficient that accords with the sensitivity set for the blocks by the first control circuit,
   a second correction coefficient that accords with the gain performed for the blocks by the control by the second control circuit, and
   a third correction coefficient that accords with the exposure time set for the blocks by the third control circuit, and
   reduces the number of tones of image data after the expansion, and generates image data of the high dynamic range.

4. The apparatus according to claim 1, further comprising: an adjustment circuit configured to control the first control circuit in accordance with a situation of image capturing of a subject and adjust brightness.

5. The apparatus according to claim 1, wherein the image capturing device is a multi-layered structure, an image capturing element is disposed on a first layer on which light is incident, and a circuit configuration pertaining to control of an exposure time is disposed on a second layer that is different from the first layer.

6. An image capturing apparatus having an image capturing device having a structure in which blocks each configured by a plurality of photoelectric conversion elements are arranged, the apparatus comprising:
   a first control circuit configured to control sensitivity in units of the blocks;
   a second control circuit configured to control an exposure time in units of the blocks;
   a third control circuit configured to control a gain of a signal of each block obtained by the image capturing device; and
   an output circuit configured to output image data of blocks obtained by the control of the third control circuit and information on the control by the first to third control circuits of the blocks to an external apparatus configured to generate image data of a high dynamic range.

7. The apparatus according to claim 6, further comprising: an adjustment circuit configured to control the first control circuit in accordance with a situation of image capturing of a subject and adjust brightness.

8. The apparatus according to claim 6, wherein the image capturing device is a multi-layered structure, an image capturing element is disposed on a first layer on which light is incident, and a circuit configuration pertaining to control of an exposure time is disposed on a second layer that is different from the first layer.

9. A method of controlling an image capturing apparatus having an image capturing device of a structure in which blocks each configured by a plurality of photoelectric conversion elements are arranged, the method comprising:
   (a) controlling sensitivity in units of the blocks;
   (b) controlling a gain of a signal for each block obtained by the image capturing device; and
   (c) by mapping image data of blocks obtained under the controlling (b) to a region that accords with sensitivity set for the blocks in a preset high dynamic range, generating image data of the high dynamic range.

10. A non-transitory computer-readable storage medium storing a program which, when read and executed by a computer, causes the computer to execute the steps of a method of controlling an image capturing apparatus having an image capturing device of a structure in which blocks each configured by a plurality of photoelectric conversion elements are arranged, the method comprising:
   (a) controlling sensitivity in units of the blocks;
   (b) controlling a gain of a signal for each block obtained by the image capturing device; and
   (c) by mapping image data of blocks obtained under the controlling (b) to a region that accords with sensitivity set for the blocks in a preset high dynamic range, generating image data of the high dynamic range.

* * * * *